Jan. 27, 1942.  C. G. OLSON  2,271,028
SCREW AND WASHER ASSEMBLING MACHINE AND METHOD
Filed July 11, 1938  16 Sheets-Sheet 1
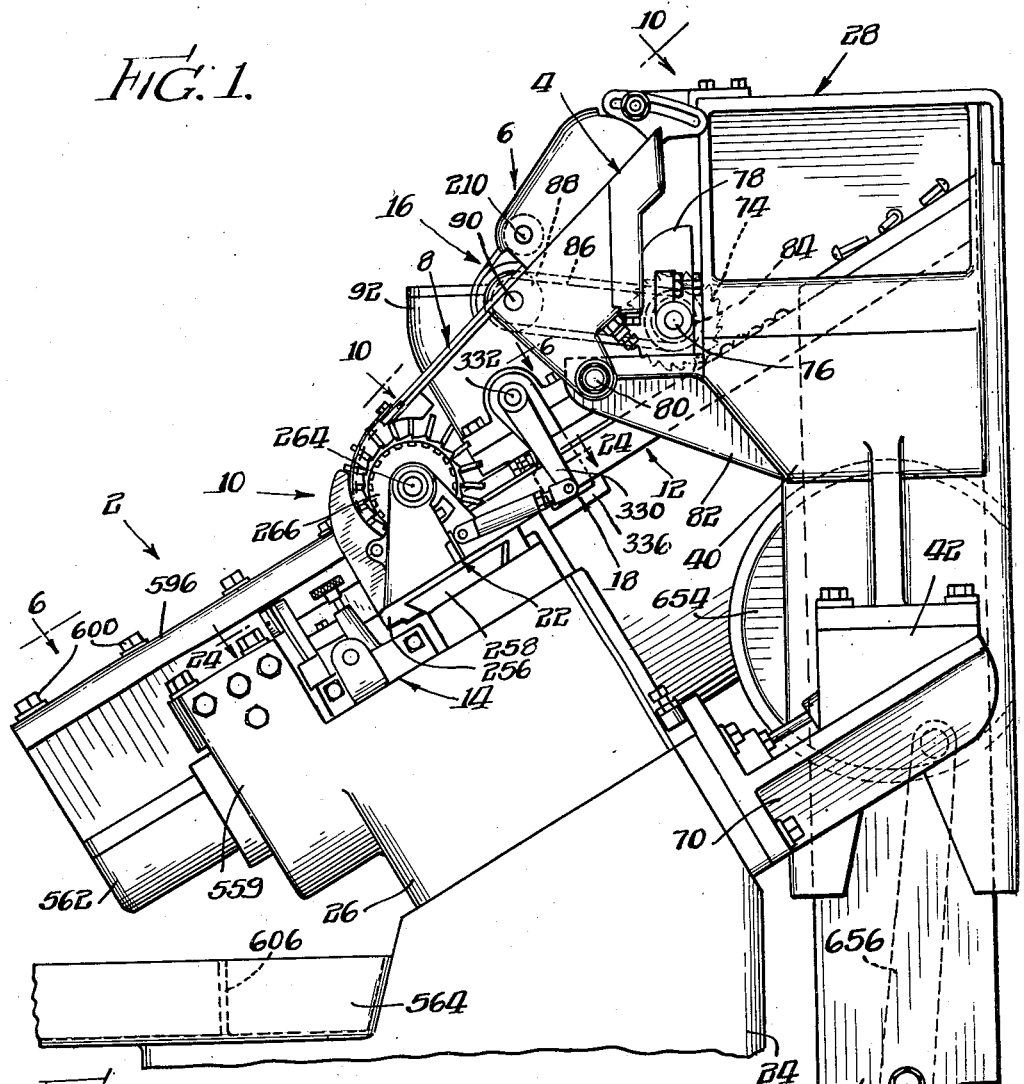
INVENTOR.
Carl G. Olson
BY: Cox & Moore
ATTORNEYS.

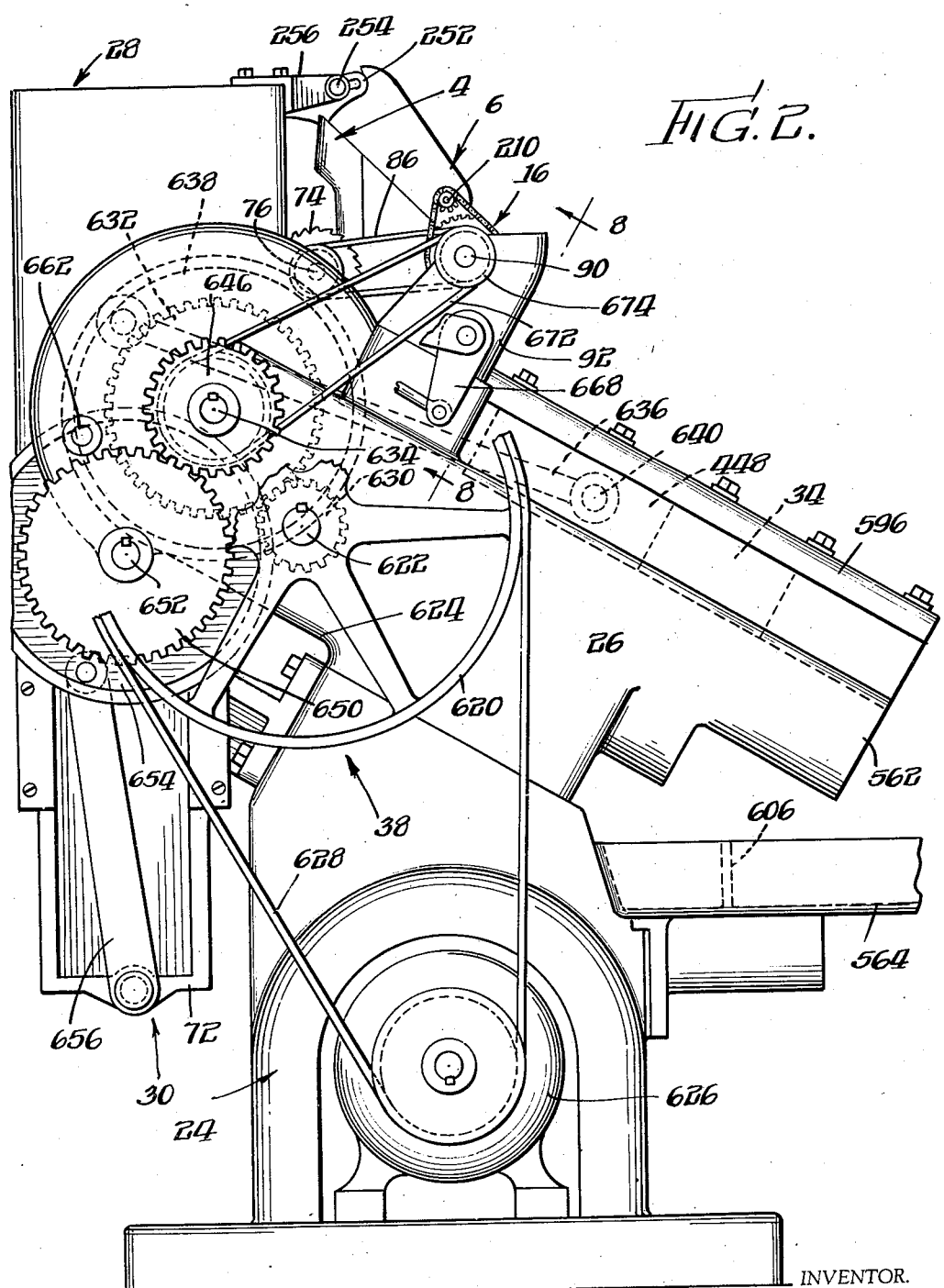

Jan. 27, 1942.    C. G. OLSON    2,271,028
SCREW AND WASHER ASSEMBLING MACHINE AND METHOD
Filed July 11, 1938    16 Sheets-Sheet 3
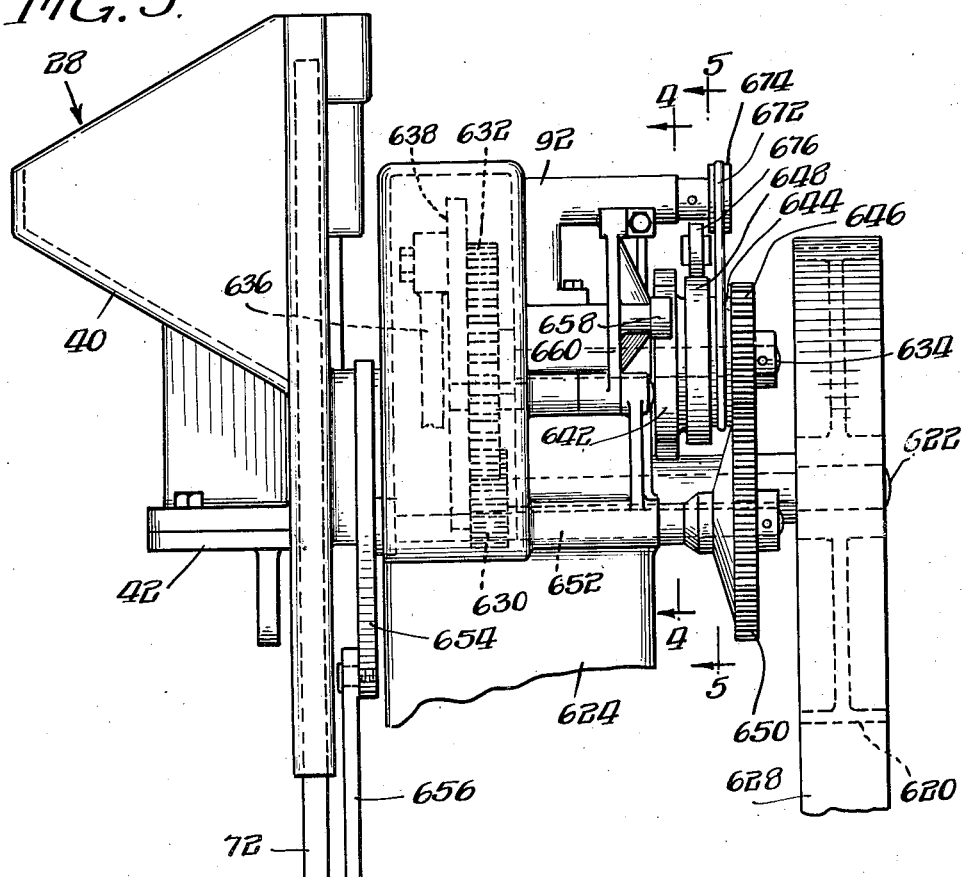
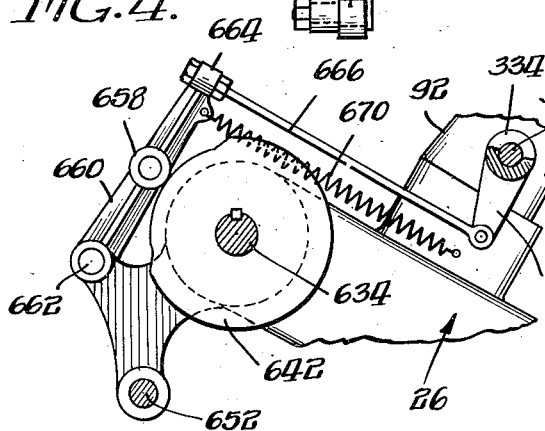
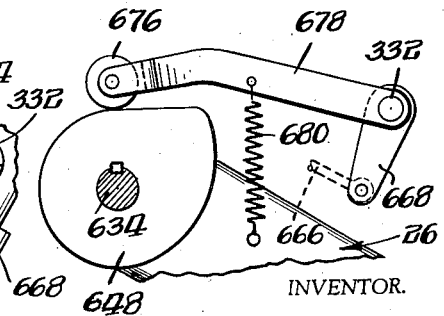
INVENTOR.
Carl G. Olson
BY: Cox & Moore
ATTORNEYS.

Jan. 27, 1942.    C. G. OLSON    2,271,028
SCREW AND WASHER ASSEMBLING MACHINE AND METHOD
Filed July 11, 1938    16 Sheets-Sheet 4
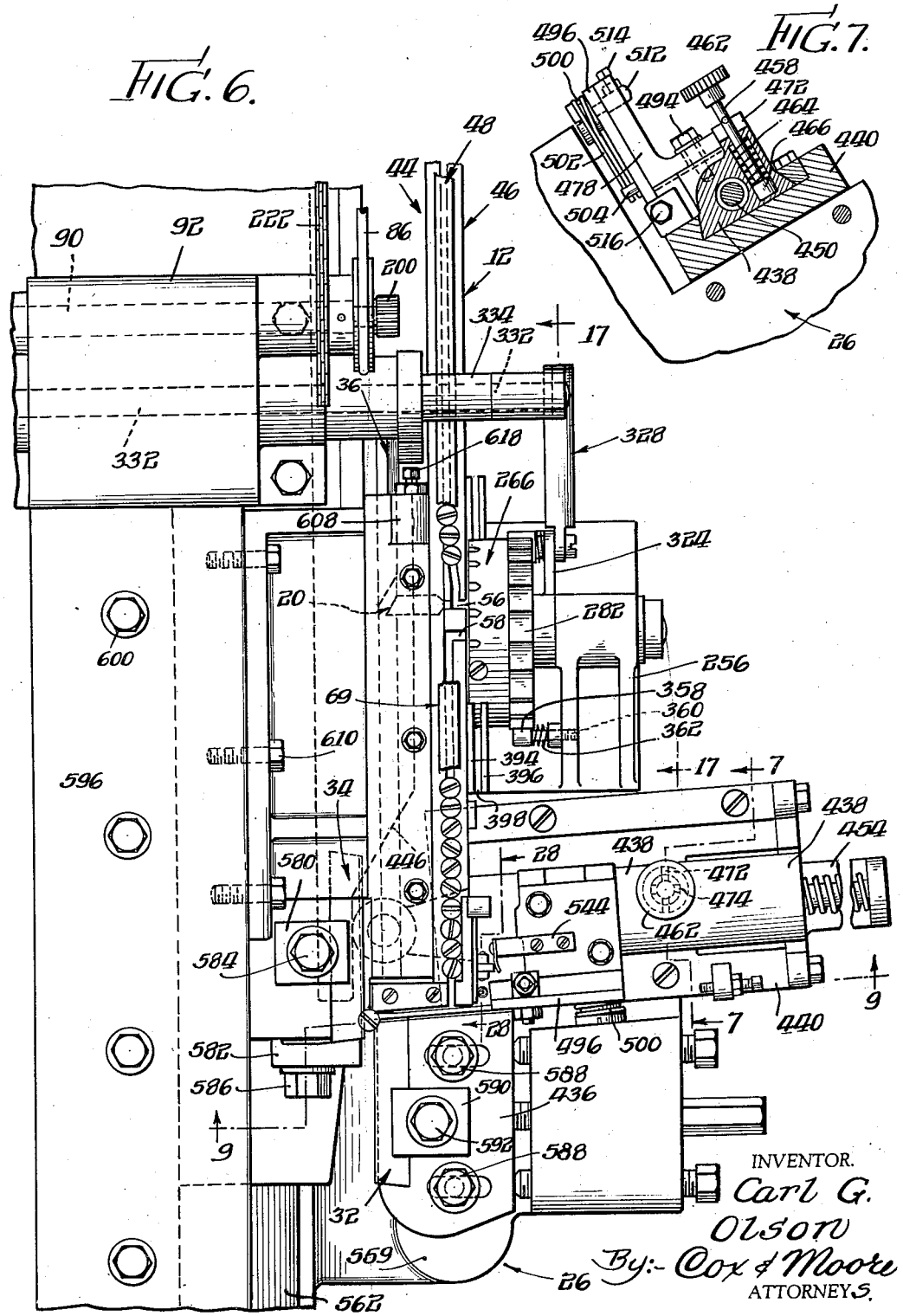
INVENTOR.
Carl G. Olson
By:- Cox & Moore
ATTORNEYS.

Jan. 27, 1942.                  C. G. OLSON                    2,271,028
                  SCREW AND WASHER ASSEMBLING MACHINE AND METHOD
                  Filed July 11, 1938            16 Sheets-Sheet 5
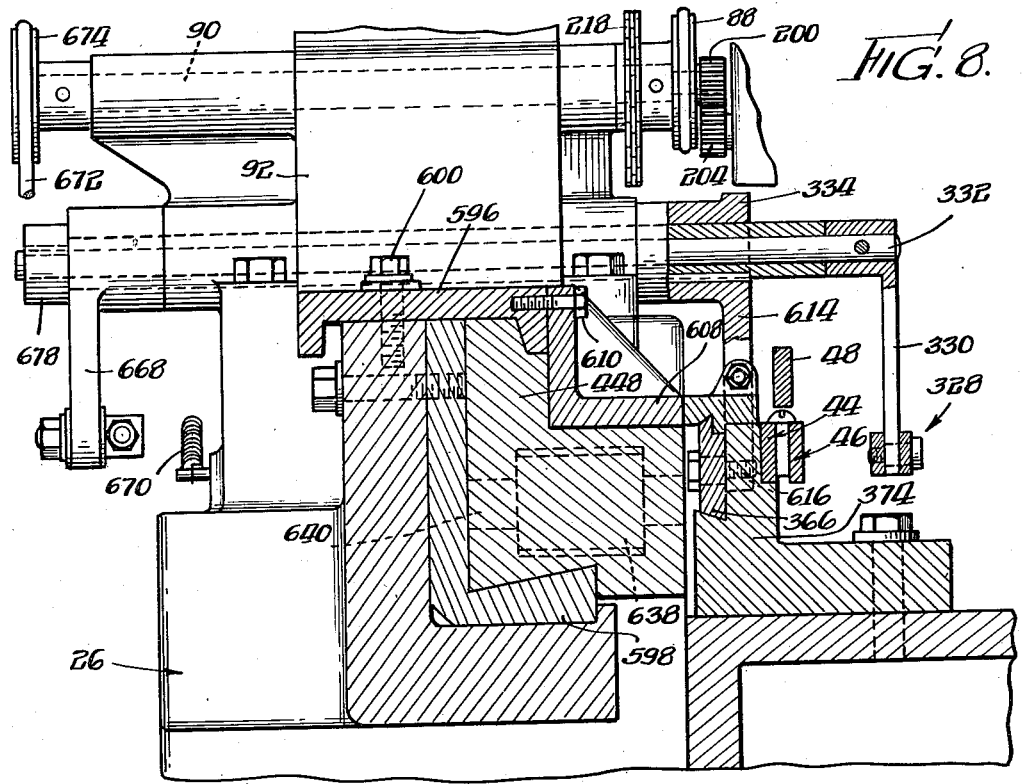
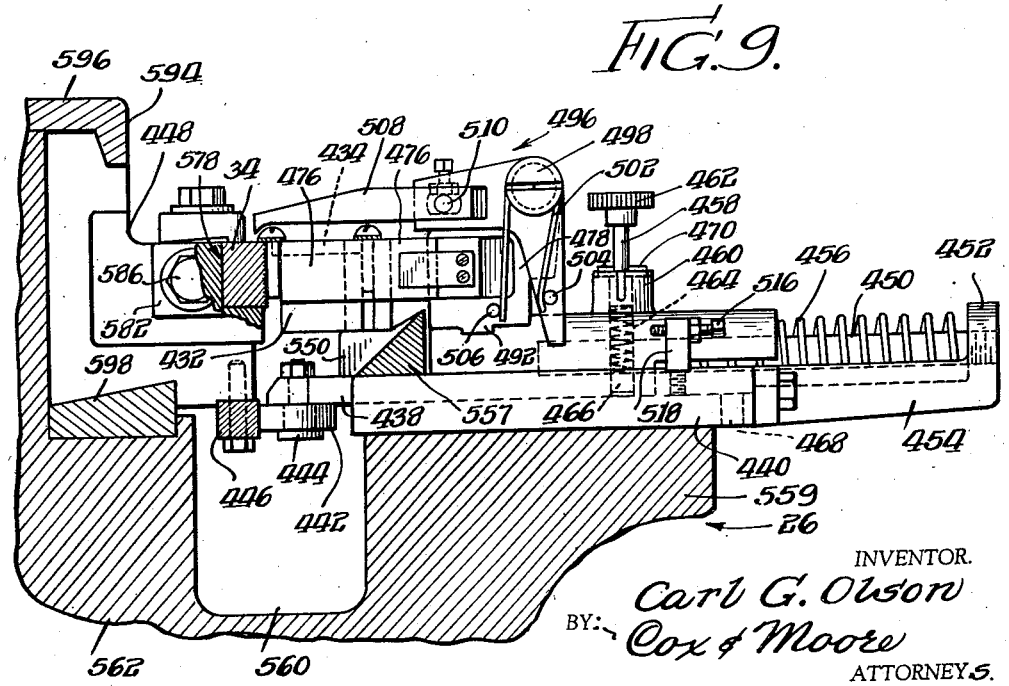
INVENTOR.
Carl G. Olson
BY: Cox & Moore
                    ATTORNEYS.

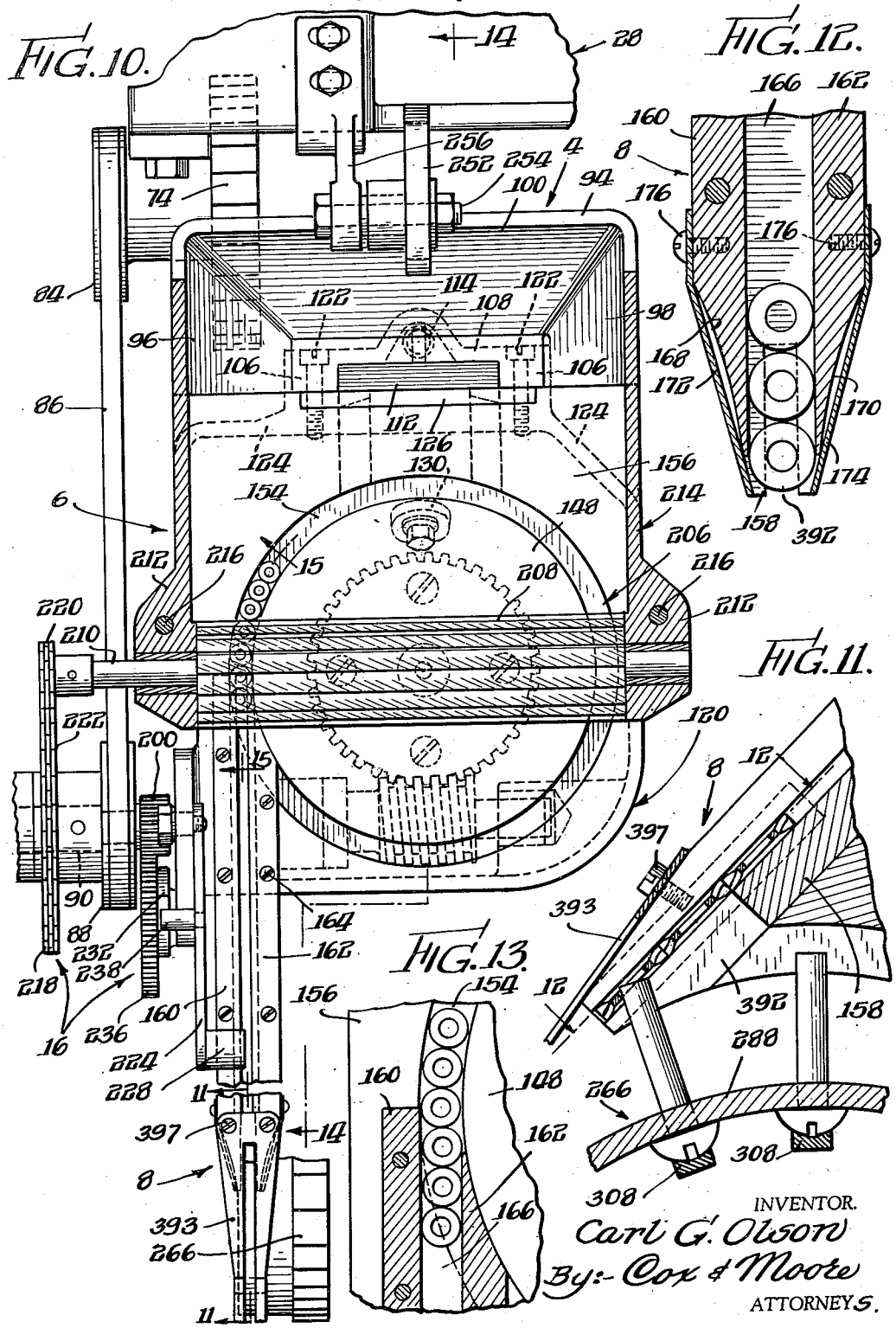

Jan. 27, 1942.  C. G. OLSON  2,271,028
SCREW AND WASHER ASSEMBLING MACHINE AND METHOD
Filed July 11, 1938  16 Sheets-Sheet 7
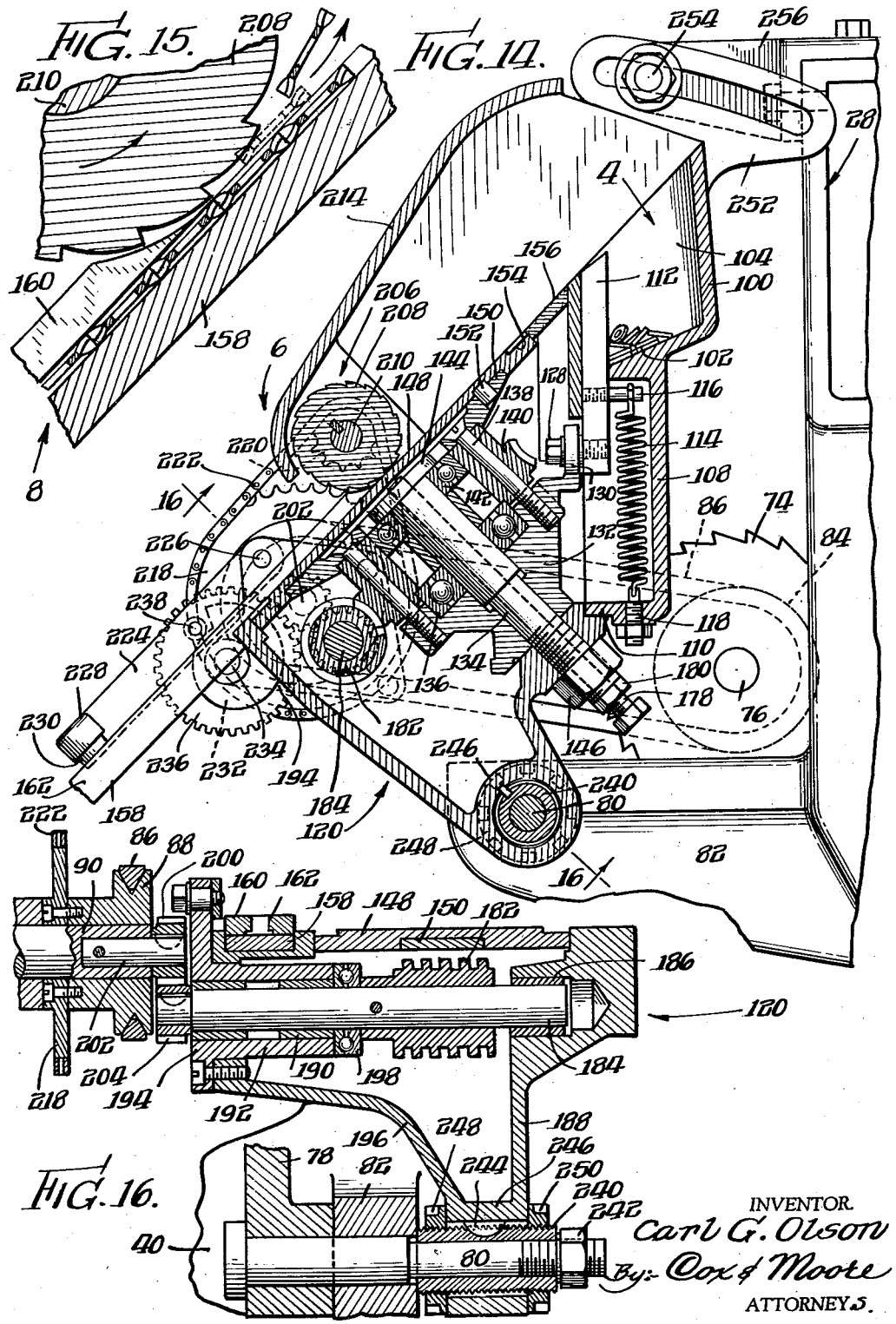
INVENTOR.
Carl G. Olson
By: Cox & Moore
ATTORNEYS.

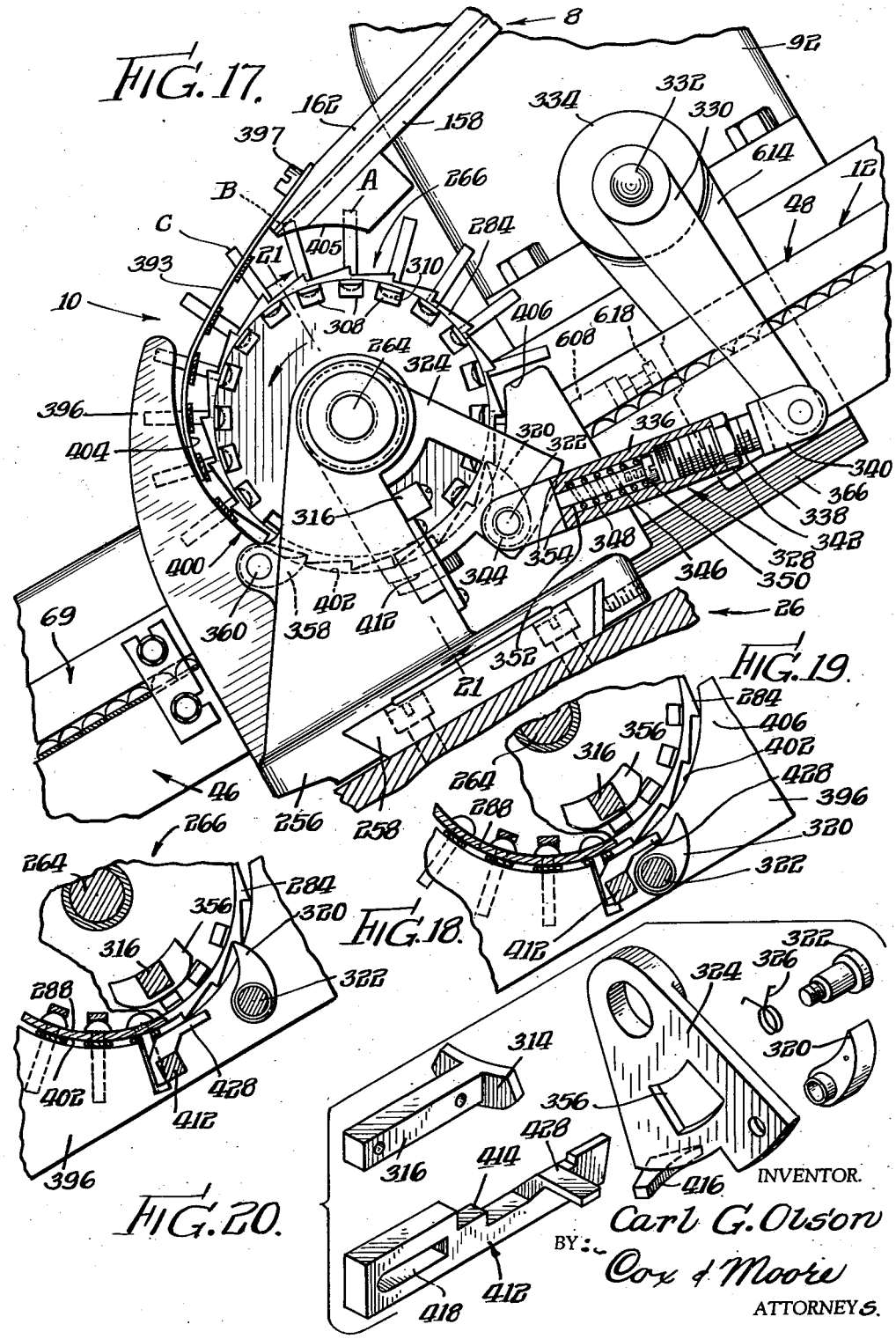

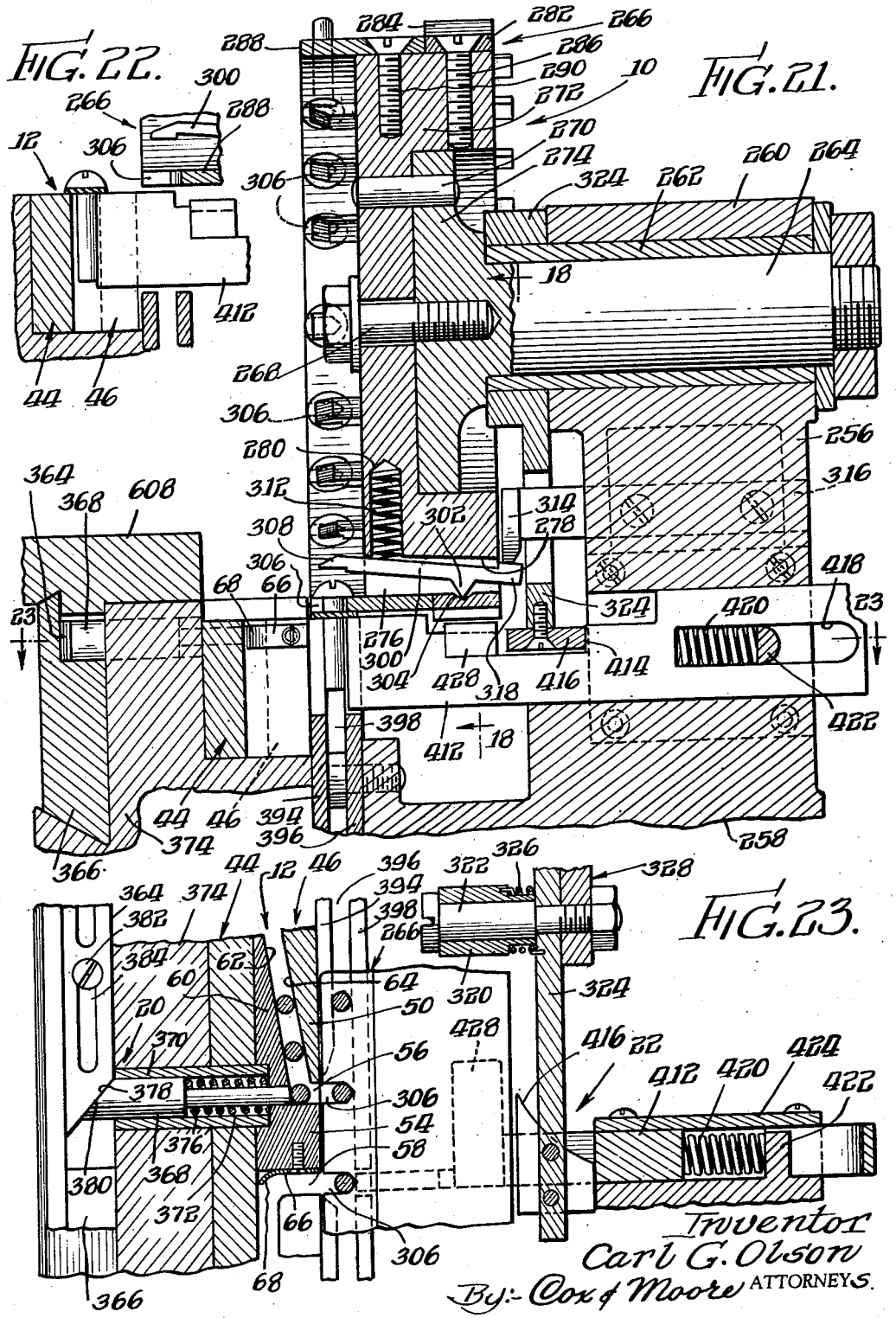

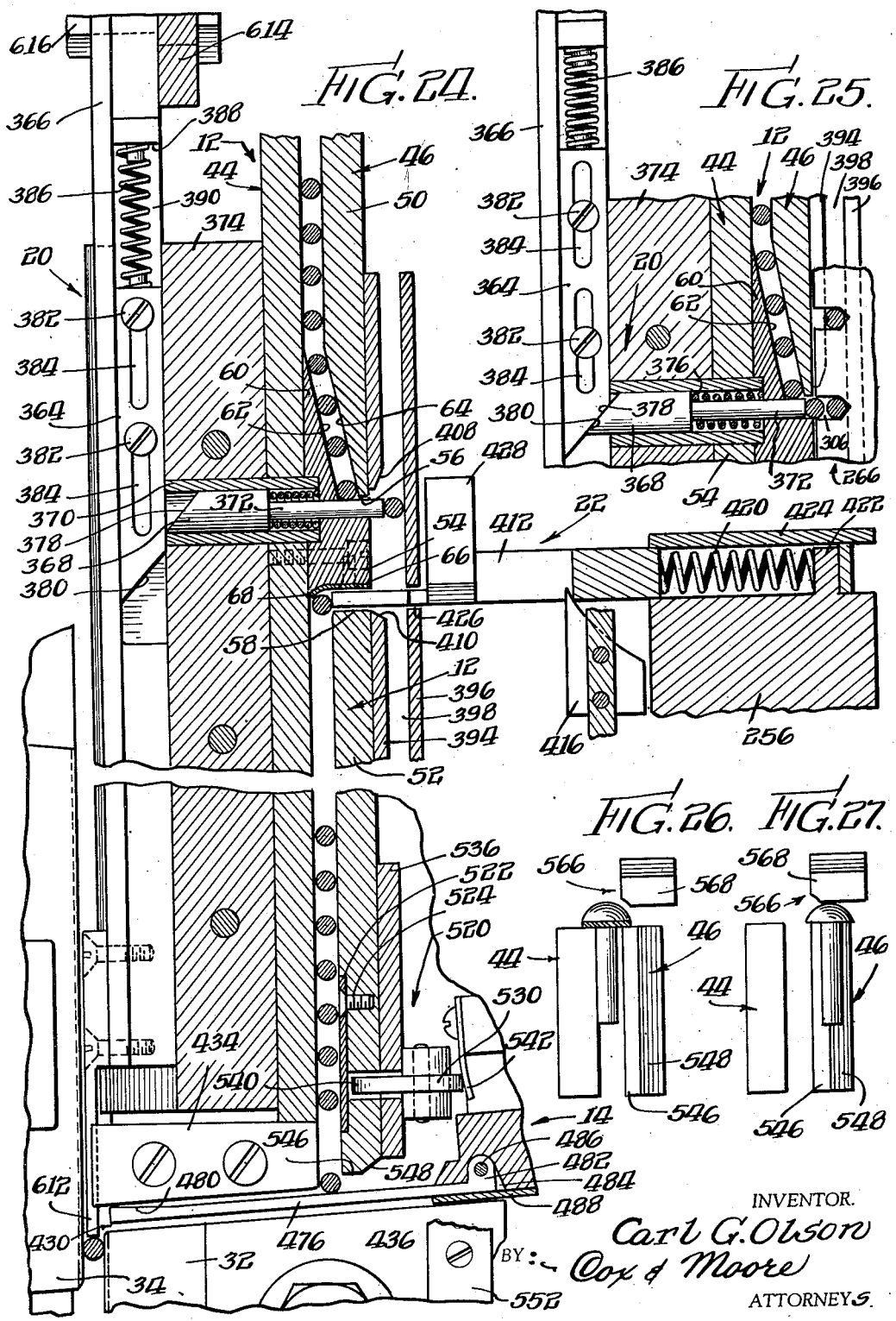

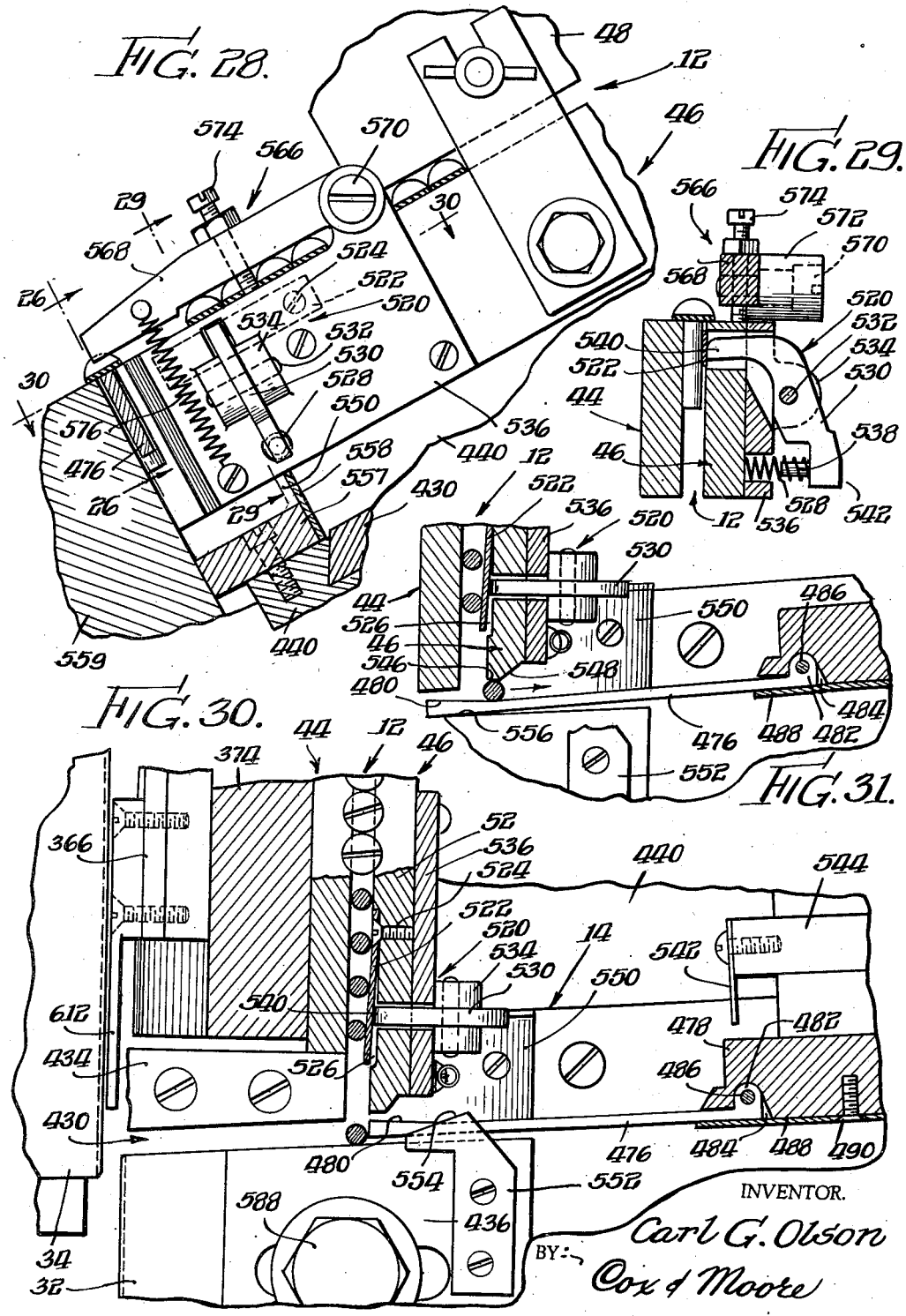

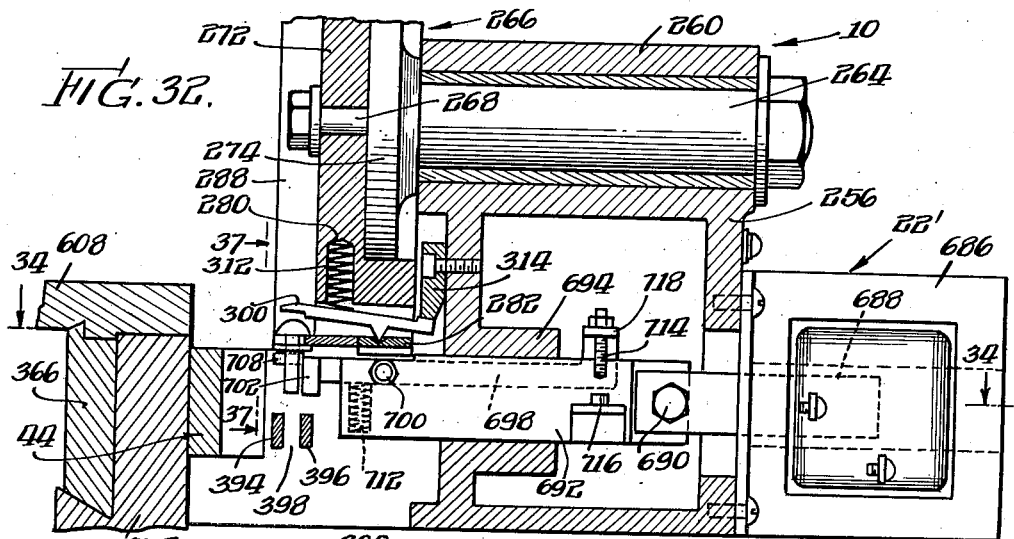
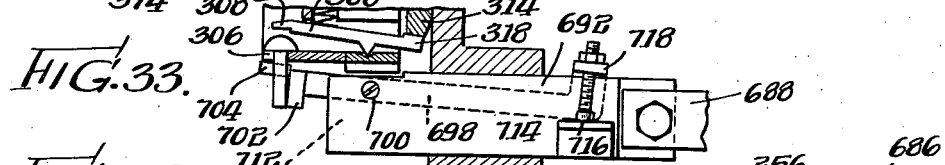
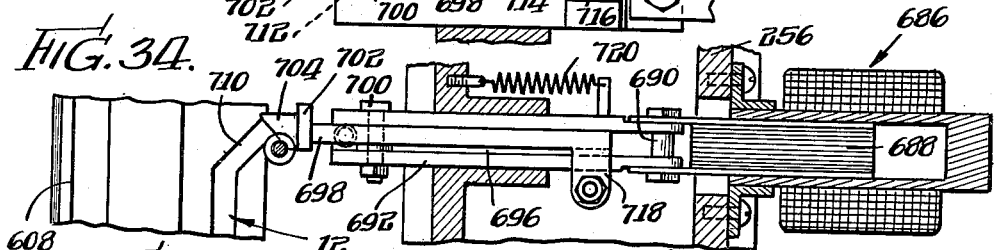
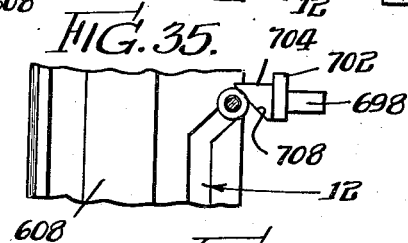
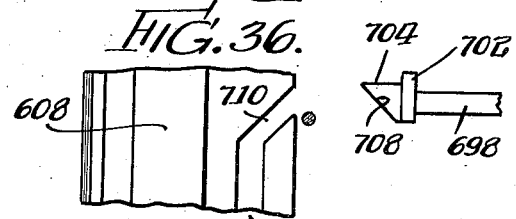
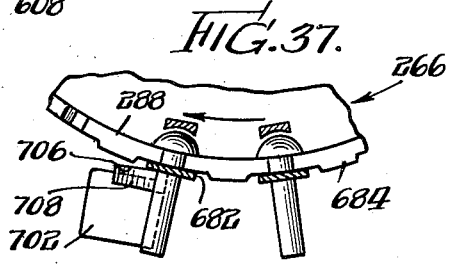
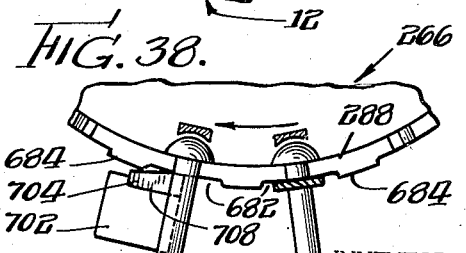

Jan. 27, 1942.　　　C. G. OLSON　　　2,271,028
SCREW AND WASHER ASSEMBLING MACHINE AND METHOD
Filed July 11, 1938　　　16 Sheets-Sheet 13
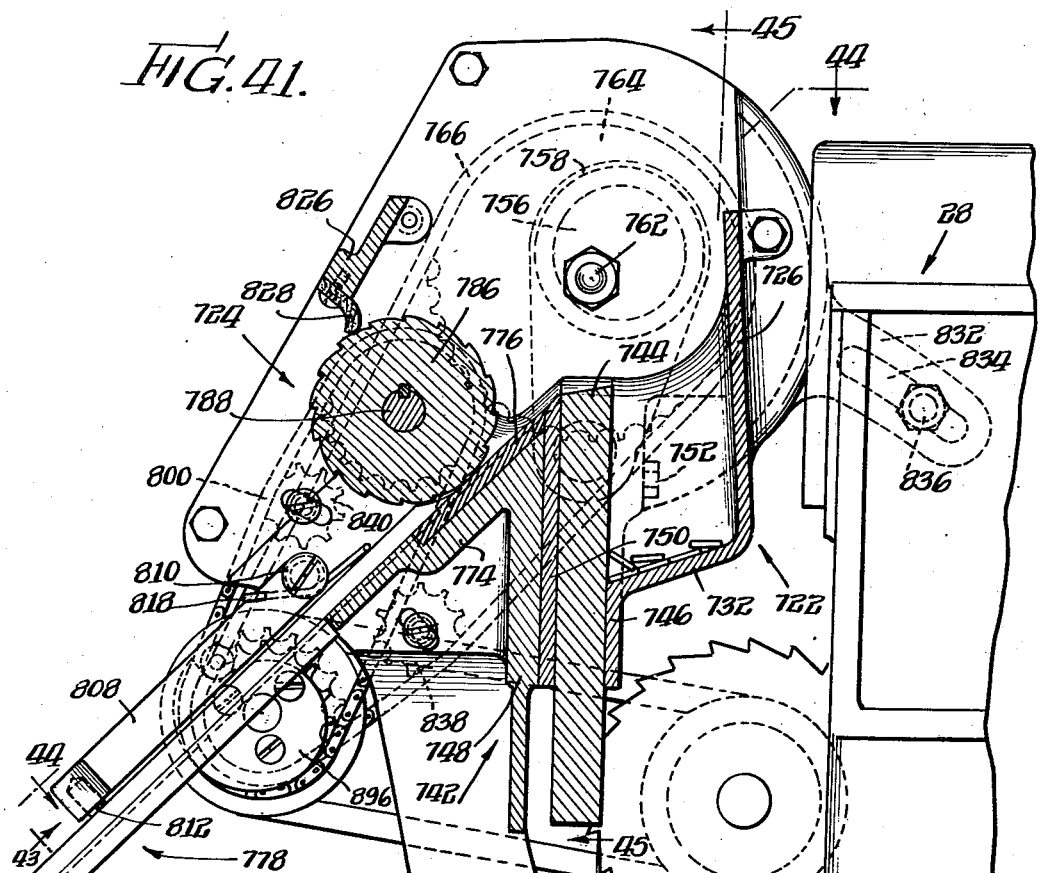
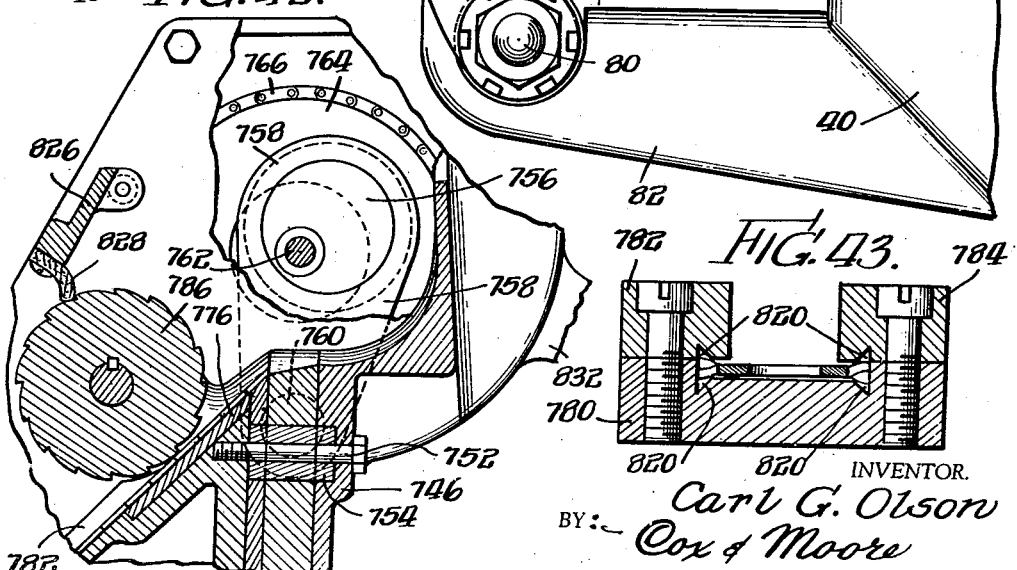
INVENTOR.
Carl G. Olson
BY Cox & Moore
ATTORNEYS.

Jan. 27, 1942.   C. G. OLSON   2,271,028
SCREW AND WASHER ASSEMBLING MACHINE AND METHOD
Filed July 11, 1938   16 Sheets-Sheet 14
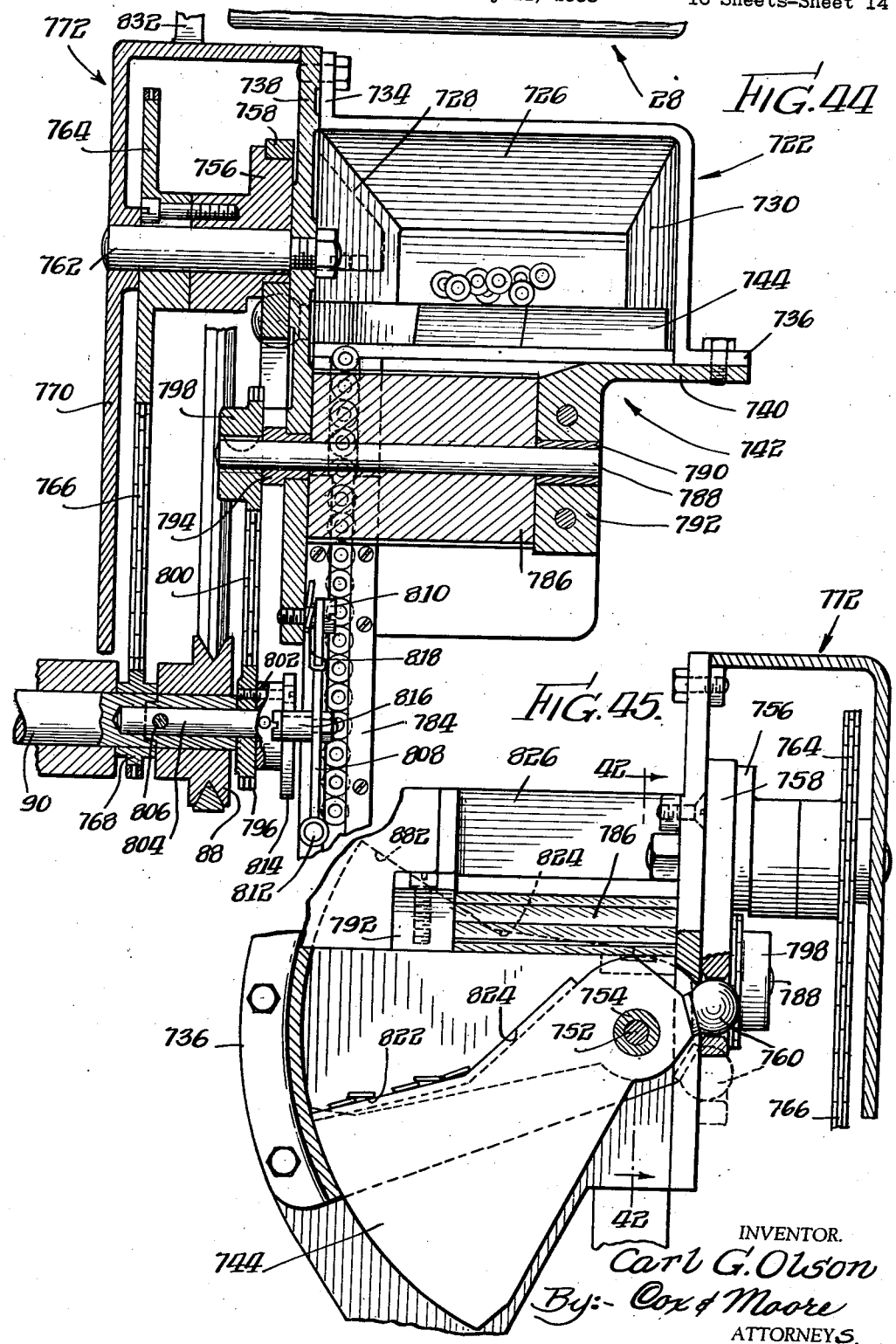
INVENTOR.
Carl G. Olson
By:- Cox & Moore
ATTORNEYS Jan. 27, 1942.   C. G. OLSON   2,271,028
SCREW AND WASHER ASSEMBLING MACHINE AND METHOD
Filed July 11, 1938   16 Sheets-Sheet 15
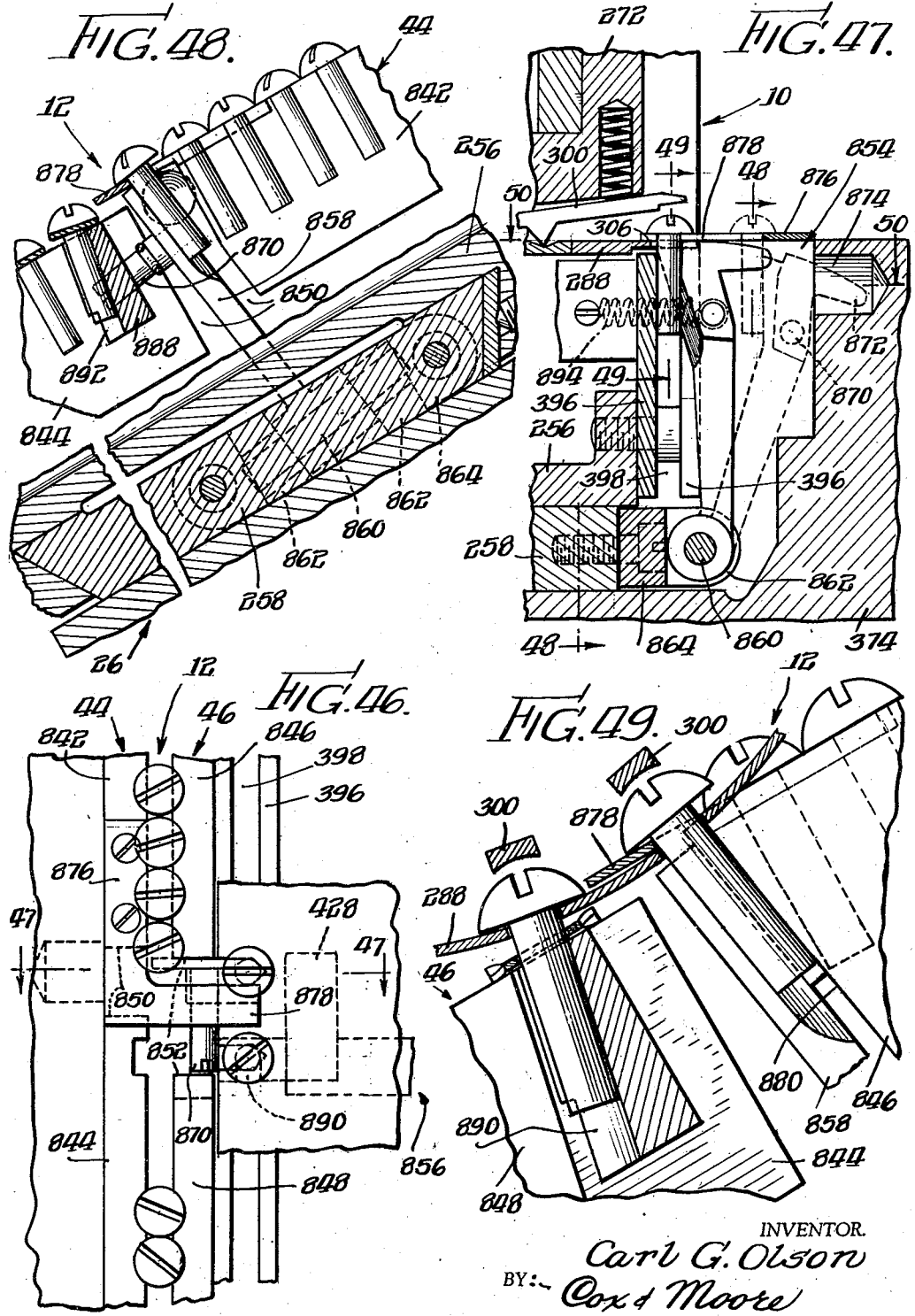
INVENTOR.
Carl G. Olson
BY: Cox & Moore
ATTORNEYS.

Jan. 27, 1942. C. G. OLSON 2,271,028
SCREW AND WASHER ASSEMBLING MACHINE AND METHOD
Filed July 11, 1938 16 Sheets-Sheet 16
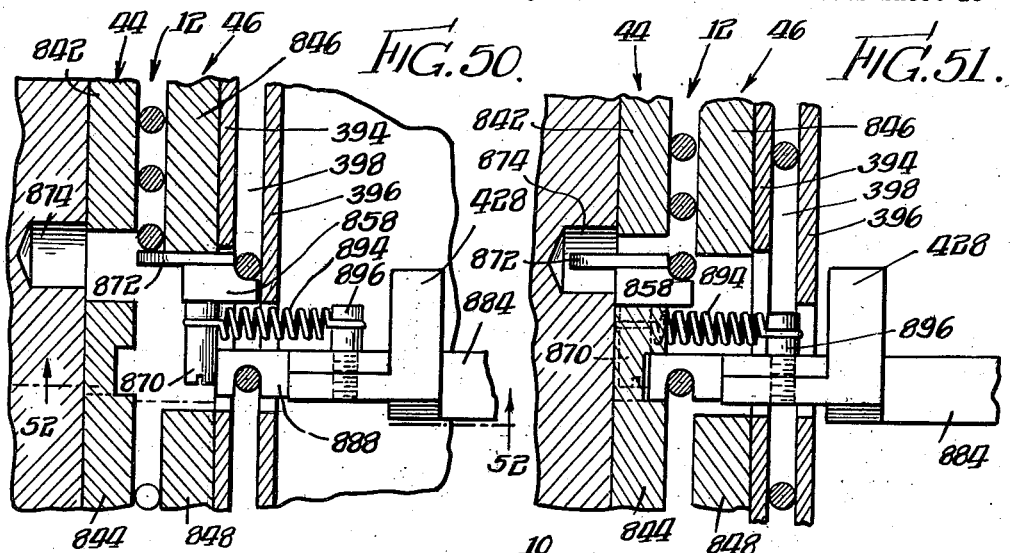
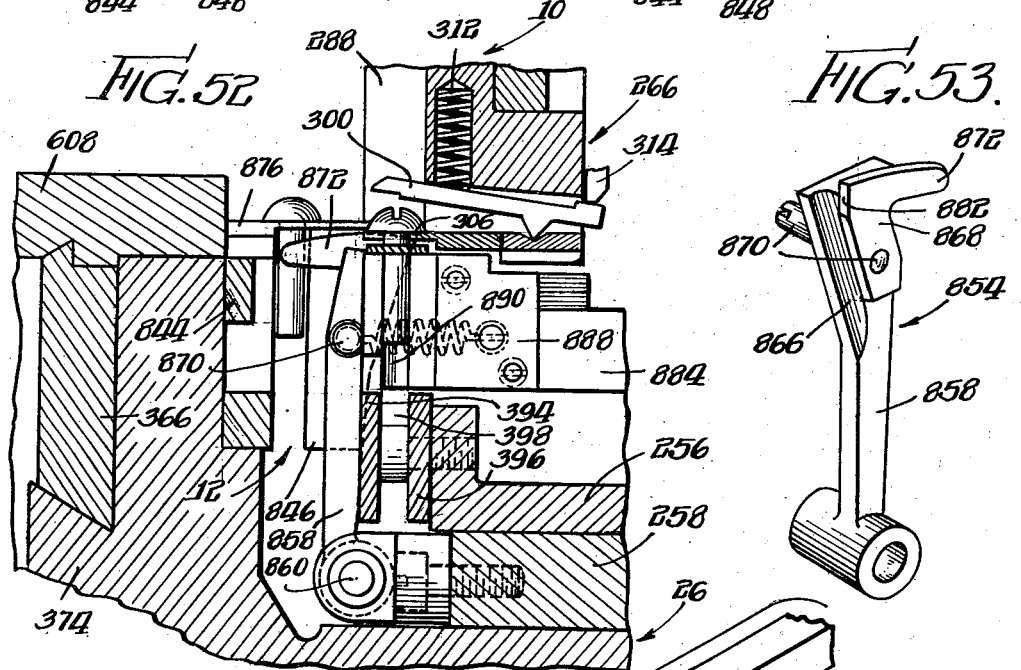
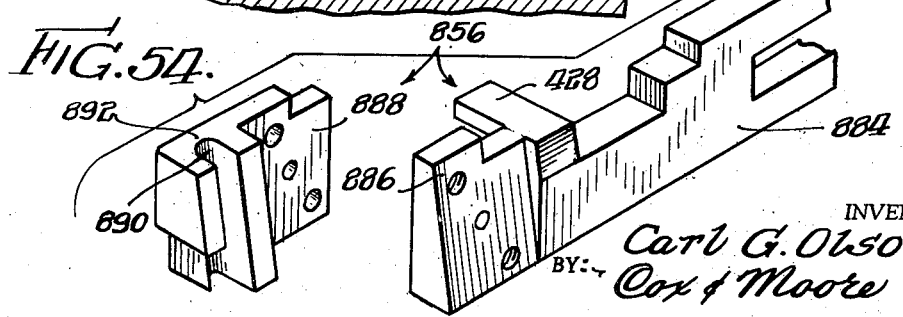
INVENTOR.
Carl G. Olson
BY: Cox & Moore
ATTORNEYS.

Patented Jan. 27, 1942

2,271,028

UNITED STATES PATENT OFFICE 2,271,028

SCREW AND WASHER ASSEMBLING MACHINE AND METHOD

Carl G. Olson, Chicago, Ill., assignor to Illinois Tool Works, Chicago, Ill., a corporation of Illinois Application July 11, 1938, Serial No. 218,680

76 Claims. (Cl. 10—2)

This invention relates to a method and machine for assembling screws and washers.

It is an object of this invention to provide a method and machine for assembling screws and washers, particularly lock washers of the toothed type, which shall so anchor the washer to the screw that they may be handled thereafter as a unit.

It is well known that by the rolling process of forming threads on a screw blank, the surface material of the blank is projected outwardly in proportion to the depth that the ribs of the thread rolling die cut into the blank, and therefore the diameter of the finished screw is greater than the diameter of the original blank.

It is therefore an object of this invention to provide a machine for assembling washers and screw blanks and, while retaining the blank and washer in assembled relation, rolling the threads thereon to thereby produce, as an article of manufacture, a permanent assembly of screw and washer.

It is a further object of this invention to provide a method for producing, as an article of manufacture, a unit assembly of a screw and a washer.

Applicant's invention further contemplates the provision of a method and a machine for selecting and conveying individual washers from a hopper containing a number of washers.

A further object of the invention is to provide a fully automatic machine of relatively simple and rugged construction for feeding washers and screw blanks from suitable hoppers, for assembling these blanks and washers substantially continuously and at a relatively high speed and, while retaining the screw blank and washer in assembled relation, rolling the threads thereon thereby to produce as an article of manufacture a permanent assembly of screw and washer.

It is a further object of this invention to devise a high speed method and mechanism for assembling screw blanks and washers and for delivering said assembled blanks and washers in a substantially continuous succession to, and in substantial synchronism with the operation of, a thread rolling mechanism whereby threads are formed on the screw blank beneath the washer thereby permanently to associate a washer with a screw.

Applicant's invention further contemplates provision of simple and efficient mechanisms for association with a standard screw thread rolling machine, whereby such standard machine may be employed automatically to produce permanent unit assemblies of screws and lock washers when supplied with screw blanks and lock washers.

Specifically, applicant's invention seeks to provide a hopper for receiving lock washers, a washer feeding mechanism, a screw blank and washer assembly mechanism, and auxiliary mechanisms which may be easily installed on a standard thread rolling machine.

Another object of applicant's invention is to provide simple and efficient means for individually feeding washers, specifically lock washers of the toothed type, from a hopper or other receptacle containing a mass of washers, in a continuous succession to a predetermined point and automatically registering with fastening elements, specifically screw blanks, separately conveyed to said predetermined point and to release said washers automatically, one by one, upon engagement with said fastening elements.

A further object is to provide a simple, efficient and readily attachable assembly mechanism for subtracting fastening elements, specifically screw blanks, from a conveyor in individual succession and for utilizing the fastening elements to subtract washer elements in individual succession from a second conveyor and to effect an assembly of said elements.

Another object is to provide, in an assembly mechanism of the above stated character, means for positively clamping each screw blank to the blank receiving element of the assembly mechanism and to provide means for operating said clamping means at a proper instant to release the blanks after assembly with the washers and to provide means to eject the assembled units in succession from said blank receiving element.

A still further object of the invention is to provide in a thread rolling machine adapted for the production of permanent unit assemblies of screw blanks and washers, transfer means or mechanism for preventing feeding of washerless screw blanks to the thread rolling mechanism.

Other and further objects and advantages of the present invention will be apparent from the following description when taken in connection with the accompanying drawings, wherein:

Fig. 1 is a view in vertical elevation of a machine embodying the invention.

Fig. 2 is a view in vertical elevation of the opposite side of the machine from that shown in Fig. 1.

Fig. 3 is a fragmentary view in vertical elevation of the rear of the machine shown in Figs. 1 and 2.

Fig. 4 is a fragmentary, vertical section taken substantially along the line 4—4 of Fig. 3.

Fig. 5 is a fragmentary, vertical section along the line 5—5 of Fig. 3.

Fig. 6 is a fragmentary, plan view partially in section and taken along the line 6—6 of Fig. 1.

Fig. 7 is a transverse section through the transfer mechanism and said section being taken along the line 7—7 of Fig. 6.

Fig. 8 is a fragmentary section along the line 8—8 of Fig. 2.

Fig. 9 is a fragmentary, longitudinal section taken through the transfer mechanism along the line 9—9 of Fig. 6.

Fig. 10 is a fragmentary section through the washer hopper and feeding mechanism, said section being taken substantially along the line 10—10 of Fig. 1.

Fig. 11 is a fragmentary, vertical section along the line 11—11 of Fig. 10.

Fig. 12 is a fragmentary, plan section along the line 12—12 of Fig. 11.

Fig. 13 is an enlarged detail of a portion of Fig. 10.

Fig. 14 is a fragmentary, vertical section taken substantially along the line 14—14 of Fig. 10.

Fig. 15 is a fragmentary, vertical section along the line 15—15 of Fig. 10.

Fig. 16 is a fragmentary section along the line 16—16 of Fig. 14.

Fig. 17 is a fragmentary, vertical section showing the assembling mechanism, said section being taken along the line 17—17 of Fig. 6.

Fig. 18 is a fragmentary, vertical section along the line 18—18 of Fig. 21.

Fig. 19 is a view in section similar to Fig. 18 but showing the elements thereof in a different position of operation.

Fig. 20 is a view in exploded perspective of the means for driving the assembly mechanism and for ejecting the assembled blanks and washers from said mechanism.

Fig. 21 is a fragmentary section along the line 21—21 of Fig. 17.

Fig. 22 is a detail view of a portion of Fig. 21 for illustrating the operation of the ejector means of the assembly mechanism.

Fig. 23 is a fragmentary, plan section taken substantially along the line 23—23 of Fig. 21, and showing the means for injecting the screw blanks into the assembly mechanism.

Fig. 24 is a fragmentary, plan section taken along the line 24—24 of Fig. 1.

Fig. 25 is a detail view of a portion of Fig. 24 and similar to Fig. 23 for showing the operation of the injector means.

Fig. 26 is a fragmentary section along the line 26—26 of Fig. 28.

Fig. 27 is a view similar to Fig. 26, showing the path of movement of a washerless screw blank.

Fig. 28 is a transverse section through the transfer mechanism, said section being taken along the line 28—28 of Fig. 6.

Fig. 29 is a fragmentary section along the line 29—29 of Fig. 28.

Fig. 30 is a fragmentary plan section along the line 30—30 of Fig. 28.

Fig. 31 is a view similar to a portion of Fig. 30 but showing the operation of the transfer mechanism in ejecting a washerless screw blank.

Fig. 32 is a view similar to Fig. 21 but illustrating a modification of the assembly mechanism including electrically operable means for ejecting the assembled units from the assembly mechanism and for preventing the ejection of washerless screw blanks from said mechanism.

Fig. 33 is a reproduction of a portion of Fig. 32 but with the ejector means automatically rendered inoperative.

Fig. 34 is a fragmentary, plan section along the line 34—34 of Fig. 32.

Fig. 35 is a reproduction of a portion of Fig. 34 for showing the path of movement of the assembled screw blank and washer being ejected from the assembly mechanism under the control of the ejector means.

Fig. 36 is a view similar to Fig. 35 but showing the path of movement of the washerless screw blank when the ejector means has been rendered inoperative.

Fig. 37 is a fragmentary view in substantially vertical section along the line 37—37 of Fig. 32.

Fig. 38 is a view similar to Fig. 37, showing the operation of the washer detector element of the ejector means.

Fig. 39 is a vertical elevation of a screw blank and lock washer assembly prior to the rolling of threads on the blank.

Fig. 40 is a vertical elevation similar to Fig. 39 but with the threads rolled on the blank.

Fig. 41 is a fragmentary view in elevation and partly in section of a modified form of washer hopper and washer feeding mechanism.

Fig. 42 is a fragmentary view in vertical section taken substantially along the line 42—42 of Fig. 45, certain parts being broken away for illustrative purposes.

Fig. 43 is a vertical section along the line 43—43 of Fig. 41.

Fig. 44 is a fragmentary section taken substantially along the line 44—44 of Fig. 41.

Fig. 45 is a fragmentary vertical section taken substantially along the line 45—45 of Fig. 41.

Fig. 46 is a fragmentary plan view showing modified injector and ejector mechanisms.

Fig. 47 is a fragmentary vertical section taken substantially along the line 47—47 of Fig. 46.

Fig. 48 is a fragmentary section along the line 48—48 of Fig. 47.

Fig. 49 is a fragmentary section along the line 49—49 of Fig. 47.

Fig. 50 is a fragmentary horizontal section taken substantially along the line 50—50 of Fig. 47.

Fig. 51 is a sectional view similar to Fig. 50 but showing the elements in a different position of operation.

Fig. 52 is a fragmentary vertical section taken substantially along the line 52—52 of Fig. 50.

Fig. 53 is a perspective view of an injector element.

Fig. 54 is a view in exploded perspective of an ejector element.

As shown in the drawings, the machine which forms one embodiment of the present invention comprises a screw thread rolling machine 2 of standard type, such as shown in Wilcox Patents No. 1,584,263 of May 11, 1926, and No. 1,798,919 of March 31, 1931, for which are provided a plurality of additional and substitute mechanisms by which said machine may be adapted for the production of a permanently assembled screw and washer unit as a new article of commerce. These additional and substitute mechanisms comprise a hopper 4 for receiving a mass of washers; a washer feed mechanism 6 for discharging the washers from the hopper 4 onto an inclined guide or feeding chute 8; a screw blank and washer assembling mechanism 10; a modified guide chute 12 for feeding the screw blanks to the assembly mechanism and from the assembly mechanism to an improved transfer mechanism 14; a drive attachment 16 for the feed mechanism 6; a driving mechanism 18 for the assembly mechanism; an injector mechanism 20 (Fig. 6) for injecting the screw blanks into the assembly mechanism from the guide chute 12; and an ejector mechanism 22 (Fig. 1) for ejecting the assembled blanks and washers from the assembly mechanism onto the lower portion of the guide chute 12.

The screw thread rolling machine comprises a main base or pedestal 24; an auxiliary base or body 26 secured to or formed integrally with the base 24 and inclined at an angle of approximately 30 degrees to the horizontal; a hopper 28 for receiving a mass of screw blanks; a screw blank feed mechanism 30 for discharging blanks from the hopper 28 onto the guide chute 12; a pair of thread rolling dies 32 and 34 (Fig. 6); a starter mechanism 36 and a driving mechanism 38.

Quantities of screw blanks are dumped or massed in the hopper 28 and quantities of lock washers are dumped or massed in the hopper 4. From the hopper 28 the screw blanks are moved or fed by the feed mechanism 30 to the guide chute 12, down which the blanks gravitate to a position in juxtaposition to the assembly mechanism 10. From this position the screw blanks are injected, one by one, into the assembly mechanism. The injected screw blanks are moved along a predetermined path, during which movement the blanks successively engage and remove washers from the feed chute 8 to which the washers have been fed by the feed mechanism 6 from the washer hopper 4.

Following the engagement or assembly of the blanks and washers, assembled units continue to move in a predetermined path through the assembly mechanism, and the assembled units are subsequently ejected from the assembly mechanism and deposited upon the lower portion of the guide chute 12.

The assembled units are fed or gravitate along this lower portion of the guide chute to the bottom end thereof and are transferred from the lower end of the chute in individual succession to a position in alinement with the thread rolling dies and are then injected or pushed between these dies where, in the forming of the threads, the surface material of the screw blank is projected outwardly and permanently retains the washer and screw in assembled relation. During the transfer operation, washerless screw blanks are rejected and these may be received in a suitable receptacle from whence they may be returned to the hopper 28.

It will be apparent from the above description that applicant's method of manufacturing preassembled units of screws and washers involves the following steps:

1. Massing a quantity of screw blanks;
2. Massing a quantity of lock washers;
3. Feeding the screw blanks in individual succession from the mass of screw blanks along a predetermined path to a predetermined position;
4. Feeding the lock washers in individual succession from the mass of washers along a predetermined path to a predetermined position;
5. Feeding the screw blanks from their first predetermined position along an arcuate path intersecting the path of movement of the lock washers; while moving along said arcuate path inserting the shank of the leading screw blank through the central opening of the leading lock washer and then feeding the assembled blank and washer along said arcuate path to a second predetermined position while retaining the washers on the blanks during such movement of the assembled blank and washer to said second predetermined position.
6. Feeding the assembled blanks and washers from said second predetermined position in the arcuate path of movement thereof along a predetermined rectilinear path to a given station, and, while moving along said path, forming on the shank of each screw blank beneath the washer thereon, threads having an outside diameter exceeding the diameter of the central hole in the lock washer.
7. Diverting from said rectilinear path washerless screw blanks and collecting such blanks at a separate station.

*The hopper and feed mechanism for the screw blanks*

As shown in Figs. 1 to 3, the hopper 28 and feed mechanism 30 for the screw blanks comprise a hopper casting 40 mounted on a casting 42 for adjustment at right angles to the guide chute 12, which is formed by spaced bars 44 and 46 (Fig. 6). The bar 44 is mounted in the usual manner at its opposite ends in supporting brackets (not shown) secured to the body 26 and to the rear of the hopper casting 40. The bar 46 is mounted upon the supporting brackets of the bar 44, in the conventional manner, to permit adjustment toward and from the bar 44 to accommodate screw blanks having shanks of different sizes. A cover plate 48, which overlies the chute 12 is secured to the bar 46 for vertical adjustment relative thereto to accommodate screw blanks having different size heads.

The outer guide bar 46 is cut into two longitudinally spaced parts or strips, an upper part 50 and a lower part 52 (Fig. 24). The inner guide bar 44 is provided with a projecting portion or block 54 extending into the space between the parts or strips 50 and 52 and forming, with the lower end of the part 50 and the upper end of the part 52, guide channels 56 and 58. A block or wedge 60, which may be formed integrally with the block 54, is secured to the inner guide bar 44 above said block 54. The outwardly tapering surface 62 of the block 60 cooperates with the inwardly tapering surface 64 of the part or strip 50 to form a guide channel for smoothly directing the screw blanks from the longitudinal channel of the upper portion of the guide chute 12 into the transverse or discharge guide channel 56.

A spring strip 66 is mounted in a recess in the lower face of the block 54 so that it lies flush with the surface of the block 54, the strip 66 having a curved end 68 extending outwardly of the block 54 to provide a resilient deflecting member for directing the temporarily assembled units from the transverse receiving channel 58 into the longitudinally extending channel of the lower portion of the guide chute 12. A cover plate 69 (Fig. 6), similar to the cover plate 48, may extend over the units in the lower portion of the guide chute 12 and may similarly be adjustably secured to the lower part 52 to accommodate screw blanks having different size heads.

The casting 42, which supports the hopper, is adjustably mounted upon a casting 70 (Fig. 1)

for adjustment along an inclined plane parallel to the plane of inclination of the auxiliary base 26 and the guide chute 12. The casting 70 is mounted upon the rear of the base or pedestal 24 in a manner to permit vertical adjustment of said casting 70 at right angles to the auxiliary base 26 and the guide chute 12.

Slidably mounted in guideways formed in the hopper casting is a reciprocating plate 72, which, as it moves upwardly, picks up screw blanks from the mass of blanks in the hopper 28 and drops them onto the guide chute 12. A clearing device, or ratchet, 74, which is secured to a shaft 76 mounted in a bracket 78, overlies the chute 12 and extends into the hopper 28 to assure uninterrupted procession of blanks down the chute and to prevent clogging of the passage from the hopper. The bracket 78 is adjustably mounted by a stud 80 on an arm 82 projecting forwardly from the hopper casting 40. The clearing device is rotated by means of a pulley 84 secured to the shaft 76, and the pulley 84 is driven by a belt 86 which passes over a sheave 88 secured to a shaft 90 rotatably journaled in bearings formed in opposite walls of an oil reservoir housing 92 supported upon the auxiliary base 26.

*The hopper and feed mechanisms for the washers*

The hopper 4 of the hopper and feed mechanisms for the washers (Figs. 1, 2 and 10 to 16) comprises a casting or housing 94 (Fig. 10) having inwardly inclined side walls 96 and 98 and a rear wall 100. The front of the housing is left open. A transverse partition or wall 102 (Fig. 14) forms with the side and rear walls a chamber 104 for receiving a mass of washers. Beneath the wall 102 the hopper is provided with vertically extending side walls 106 (Fig. 10), a rear wall 108 (Figs. 10 and 14), and a bottom, laterally extending wall 110 forming a chamber for receiving a reciprocating washer feed plate 112. The bottom wall 110 also forms a support by which the hopper casting 4 may be secured in a suitable manner to the casting of the washer feed mechanism 6. The rear wall 108 is offset centrally thereof (Fig. 10) to form a housing for a coil spring 114 (Fig. 14) which is secured at one end by a pin 116 to the reciprocating plate 112 and at its other end is adjustably secured by a set screw 118 to the bottom wall 110.

The hopper casting 94 abuts the casting 120 of the washer feed mechanism 6 to which it may be fastened in any desired manner as by bolts 122 (Fig. 10) passing through the side walls 106 of the hopper 4 and the rear wall 124 of the casting or housing 120. The feed plate 112 is guided in its reciprocating movements by the walls 106 and 108 and a plate 126 clamped between the walls 106 of the hopper 4 and the end wall 124 of the casting 120. The plate 126 extends substantially to the bottom wall 110 of the hopper 4 and is cut away between the wall 110 and the partition 102 to provide an opening into which extends a pin or bolt 128 (Fig. 14) secured to the lower portion of the feed plate 112, and an operating or cam roller 130 is secured to the pin 128 to cause the feed plate to reciprocate in accordance with the rotation of a feed cam 132 mounted within the casting 120. The feed plate 112 reciprocates vertically within the hopper chamber 104 through a suitable slot provided in the partition 102.

The cam 132 is journaled on a sleeve 134 and a roller bearing 136 and is operatively secured as by bolts 138 to a worm wheel 140 rotatably journaled on the sleeve 134 by means of the roller bearing 136 and a second roller bearing 142. The sleeve 134 has an enlarged head 144 overlying the roller bearing 142 and is externally threaded at its lower end to receive a nut 146, the enlarged head 144 and the nut 146 maintaining the roller bearings, the worm wheel and the cam in assembled relation on the sleeve.

A rotary washer feed plate or disk 148 is detachably secured to a ring 150 for rotation therewith by means of pins or dowels 152. The ring 150 is secured to the worm wheel 140, for rotation therewith, by the bolts 138. The rotary feed plate 148 has a peripherally extending recess 154 in its upper face, the radial width of this recess being substantially equal to the diameter of the washers to be fed. The feed plate 148 rotates within a circular opening in the top plate 156 of the casting 120 and the upper surface of the feed plate is flush with the upper surface of the top plate 156, which latter surface is machined or otherwise brought to a smooth finish so that the washers may readily move by gravity over such surface and into the peripheral recess 154 of the rotary feed plate. The walls of the peripheral recess 154 are similarly machined or brought to a smooth finish so that at the proper instant a washer within the recess may freely move by gravity into the inclined washer feed chute 8.

The washer feed chute 8 comprises a bottom plate or bar 158 (Figs. 11 and 14 to 16) having a smooth upper surface and upper, spaced apart guide bars 160 and 162 (Figs. 10 and 12 to 16). These bars 158, 160 and 162 are detachably secured to the top plate 156 of the casting 120 as by bolts or screws 164 (Fig. 10) and extend forwardly from said casting to a predetermined point in juxtaposition to the assembling mechanism 10. The lower inner edges of the guide bars 160 and 162 are cut away or recessed, as shown in Figs. 12, 13 and 16, to form a channel 166 (Figs. 12 and 13) along which the lock washers gravitate from the washer feed mechanism to the assembling mechanism. At their lower ends the guide bars 160 and 162 are slotted or cut away as at 168 and 170, respectively (Fig. 12), to receive resilient catches 172 and 174, the outer free ends of which extend into the guide channel 166 in a position to engage the leading lock washer in the guide chute; to position this leading washer properly for assembly with a screw blank; to hold the line washers against dropping out of the end of the guide chute and to release the leading washer when engaged by a screw blank projecting through the central opening thereof. These resilient catches 172 and 174 comprise strips of spring metal secured as by screws 176 or the like to the outer edges of the guide bars 160 and 162.

The guide chute 8 is detachably associated with the casting 120 and the feed plate or disk 148 is detachably associated with the driving ring 150 so that a similar chute and a similar disk, dimensioned to accommodate a different size of washer, may be readily substituted therefor.

In order to facilitate the detachment of the feed plate or disk 148 from the driving ring 150, a pusher pin or rod 178 is provided (Fig. 14). The rod extends centrally through the sleeve 134 and is externally threaded at its lower end to engage the internal threads of the sleeve 134 so that the rod 178, upon rotation, will be moved axially of the sleeve 134 from its normal position shown in Fig. 14 to engage the undersurface of the feed disk 148 substantially at its center, and lift the same from the driving ring 150. A lock nut 180 engaging the lower edge of the sleeve 134 retains the rod 178 in its normal, inoperative position of adjustment.

The worm wheel 140 is driven by a worm 182 (Fig. 14) secured to a shaft 184 journaled at one end by a bushing 186 (Fig. 16) mounted in the side wall 188 of the casting 120. The other end of the shaft 184 is journaled in a bushing 190 carried by the boss 192 of a cover plate 194 bolted to the opposite side wall 196 of the casting 120. An antifriction, or roller, bearing 198 is interposed between the worm 182 and the boss 192.

The shaft 184 is continuously driven by the shaft 90 through a gear 200 secured to a stud 202 extending into the apertured end of the shaft 90 and fastened thereto. A gear 204 secured to the end of the shaft 184 meshes with the gear 200.

A clearing device 206 (Figs. 10, 14 and 15) comprises a toothed and knurled roller 208 secured to a shaft 210 journaled in opposed bearings 212 (Fig. 10) formed in the side walls of the cover 214 for the hopper 4, the cover 214 also enclosing the upper halves of the top plate 156 of the casting 120 and the feed plate or disk 148. This cover 214 may be detachably secured to the casting 120 in any desired manner, as for example by means of screws or bolts 216 (Fig. 10) extending through the embossments forming the bearings 212 and through suitable embossments formed on the side walls of the casting 120.

The shaft 210 of the clearing device 206 is rotated by the shaft 90 through sprockets 218 and 220 and sprocket chain 222.

It should be noted that, as shown in Fig. 10, the bars 158, 160 and 162 of the washer chute 8 extend substantially to the plane passing through the axes of the roller 208 and the feed disk 148, the guide bars 160 and 162 extending over the peripherally extending recess 154 in the upper face of the disk. The clearing roller 208 is precisely adjusted by any suitable means, as for example by means of shims inserted between the cover 214 and the casting 120, so that it is substantially tangent to the plane of the disk 148 but does not contact the disk and this roller is driven in a counterclockwise direction, as seen in Fig. 14, so as to impel washers which do not lie in the peripheral recess 154 of the disk 148 in a rearward direction, thereby preventing clogging of the guide chute 8 and the escape of washers from the feeding mechanism other than through said guide chute.

Means are provided for preventing sticking or jamming of the washers in the guide chute 8 and for insuring the free movement of the washers along the chute. This means comprises a hammer or vibrator in the form of a lever 224 (Figs. 10 and 14) pivoted at at 226 to the side cover plate 194 and provided at its free end with a head 228 overlying one or both of the guide bars 160—162, the head 228 being provided with an impact member or button 230 of hard rubber or like material.

The lever 224 is raised and released by a cam 232 secured to a stud 234 (Fig. 14) journaled in an extension of the side cover plate 194, the stud 234 being driven by a gear 236 secured thereto and meshing with the gear 200 (Fig. 10). The lever 224 carries a pin 238 which, by the weight of the lever, is maintained in engagement with the surface of the cam 232. This lever acts as a continuously operated hammer, periodically striking one or both of the guide bars 160—162 with sufficient force to cause a vibration of the guide chute or the washers therein to facilitate the free movement of the washers down the guide chute.

The casting 120, which acts as a support for the washer feed mechanism 6 and the washer hopper 4, is adjustably mounted upon the bracket 82 so that the free end of the guide chute 8 may be precisely positioned with respect to the assembly mechanism 10. This mounting comprises an externally threaded sleeve 240 (Fig. 16) journaled on the stud 80 and interposed between the nut 242 on said stud and the outer face of the bracket 82. The externally threaded sleeve 240 is splined by a key 244 to the bearing or boss 246 formed integrally with the opposed side walls 188 and 196 of the casting 120. Opposed clamping nuts 248 and 250 threaded on the sleeve 240 adjustably secure the casting against movement longitudinally of said sleeve and the casting is adjustably secured against rotary movement about the stud 80 by means of an arcuately slotted bracket 252 (Fig. 14) secured to or formed integrally with the rear wall 100 of the washer hopper 4 and a bolt 254 carried by a bracket 256 secured to the hopper 28 for the screw blanks.

The operation of the washer feed mechanism 6 in feeding washers from the hoppers 4 in individual succession to the guide chute 8 is substantially as follows: The vertically reciprocating feed plate 112 deposits washers from the hopper onto the top plate 156 whence they gravitate to the feed disk 148, certain ones of the washers falling into the peripheral recess 154 of said disk and being carried by said disk to a position in alinement with the channel 166 in the guide chute 8 and being directed by the outer guide bar 162 into said channel 166. The washers then gravitate downwardly along the channel 166, the free movement of the washers being assured by the impact member 230. The clearing device 206 prevents the escape of all washers other than those within the peripheral recess 154 and prevents clogging of the entrance to the guide chute 8. The clearing roller 208 in rotating in a counterclockwise direction throws these other washers backwardly with respect to the surface of the top plate 156 and facilitates their depositing in the peripheral recess 154.

It should be noted that the shaft 90 forms a part of the standard thread rolling machine and that the adaptation of this shaft for the driving of the washer feed mechanism involves merely the fastening of the sprocket 218 to said shaft or to the pulley 88, which is also a part of the standard machine, and the drilling of said shaft to receive the stud 202.

*The assembly mechanism and the associated injector and ejector mechanisms*

The assembly mechanism, as best shown in Figs. 1, 6 and 17 to 25, preferably comprises a bracket 256 slidably mounted upon a guide plate 258 secured to the auxiliary base or pedestal 26. The bracket 256 provides a bearing 260 (Fig. 21) receiving a bushing 262 in which is journaled a shaft 264. An assembly wheel 266 is secured to the shaft 264 as by means of a bolt 268 and angularly spaced pins 270 passing through the diskline central portion 272 of the assembly wheel and into the enlarged disk-like head 274 of the shaft 264.

The periphery of the disk-like portion 272 of the assembly wheel is provided with a plurality of axially extending, angularly spaced slots or recesses 276, the bottom wall 278 of each of these recesses being inclined from the rear face to the front face of the disk 272, and each axial recess 276 connects with a radial opening 280. An annulus or rim 282, having ratchet teeth 284, is secured to the disk 272 as by bolts 286. A second annulus or rim 288 is also secured to the disk 272 as by bolts 290 and projects forwardly from beyond the front face of the disk. The rims 282 and 288 enclose the angularly spaced recesses 276, thereby forming with said disk a housing for a plurality of angularly spaced clamping members or levers 300 of which one is mounted in each opening 276. Each lever is provided with a projection 302 forming a knife edge engaging a V-shaped notch 304 in the rim 282 to provide a fulcrum for said lever and each lever extends forwardly beyond the front face of the disk 272 and rearwardly beyond the rear face thereof. The rim 288 is formed with a plurality of angularly spaced recesses or slots 306 in axial alinement with the openings 276, the recesses 306 being each of a width slightly greater than the shank diameter of the screw blank.

It should be noted that the assembly wheel 266 is readily detachable from the shaft 264 so that assembly wheels having openings 306 and levers 300 of different sizes may be substituted to accommodate different sizes of screw blanks.

The forwardly projecting end 308 of each clamping member or lever 300 is formed with a notch or groove 310 (Fig. 17) which in cross section is substantially semicircular so as to receive the head of a screw blank and so that the lever 300 may cooperate with the rim 288 in clamping the screw blank to the assembly wheel. If screw blanks having flat or fillister heads are to be assembled with the washers, the notch 310 in each clamping member will be similarly varied in shape.

A coil spring 312 (Fig. 21) is mounted within each radial opening 280 and bears against the inner face of the lever 300 to urge this lever into a clamping position with respect to the rim 288. Each lever or clamping member 300 is operated in a clockwise direction (as seen in Fig. 21) against the action of its spring 312 by means of a fixed cam 314 (Figs. 20 and 21) carried by a bar 316 fastened to the bracket 256, the cam 314 engaging the rearwardly extending end portion 318 of each lever as the lever and the screw blank clamped thereby are moved into alinement with the guide channel 58 in the guide chute 12 (see Fig. 24). The cam maintains the lever in its released position until after it has passed out of alinement with the guide channel 56 in said guide chute.

The assembly wheel 266 is intermittently rotated or driven by a dog or pawl 320 (Figs. 17 to 20) journaled on a pin 322 carried by a lever or plate 324 journaled on the bushing 262 between the disk 274 and the bearing 260 (see Fig. 21). A spring 326, secured at one end to the pawl 320 and at its other end to the plate or lever 324, urges the pawl into engagement with the ratchet teeth 284 of the rim 282. The lever 324 is oscillated through a predetermined angle by means of a safety link 328 pivotally secured at one end to the pin 322 and at its other end to a crank 330 secured to the end of a shaft 332 forming part of the drive mechanism 18 for the assembly mechanism 10. The shaft 332 is journaled in a sleeve 334 which, in turn, is journaled in suitable bearings formed in the opposed side walls of the oil reservoir housing 92.

The safety link 328 comprises a tube 336 threaded on a rod 338 carried by the bifurcated block 340 pivoted to the crank 330. The tube 336 is held in adjusted position on the rod 338 by a clamp nut 342. A block or bar 344 pivoted on the pin 322 has a reduced, preferably cylindrical, portion 346 received within the tube 336. A coil spring 348, interposed between the head of a screw 350 secured to the end of the portion 346 and an annular flange 352 at the end of the tube 336, normally maintains that end of the tube in engagement with the shoulders 354. The distance between the annular flange 352 and the screw 350 is sufficient to accommodate the full movement of the crank 330 so that if for any reason the assembly wheel 266 becomes jammed or held against movement the tube 336 may move against the action of the spring 348 relative to the bar 344.

The lever 324 is provided with an arcuate slot 356 to accommodate the fixed bar 316 which carries the cam 314 so that the lever may move relative to this bar.

A pawl 358 (Figs. 6 and 17) pivoted as at 360 to the bracket 256 and actuated by a spring 362 secured to the pawl 358 and to the bracket 256, engages the ratchet teeth 284 and provides means for latching the assembly wheel against reverse rotation.

The screw blank injector mechanism 20 is associated with the guide chute 12 and with the assembly mechanism 10 for the purpose of moving or transferring the screw blanks successively from the upper portion of the guide chute into the blank receiving recesses or slots 306 in the periphery of the assembly wheel. This mechanism, as best shown in Figs. 23, 24 and 25, comprises a cam plate or bar 364, carried by a reciprocating slide bar 366 forming part of the standard starter mechanism 36. A plunger 368, slidably mounted in a housing 370, is provided with a preferably cylindrical stem 372 adapted to reciprocate within the transversely extending guide channel 56 of the guide chute 12. The housing 370 for the plunger 368 is preferably press fitted into an opening cut in the standard slide bar guide or bracket 374 and the bar 44 of the guide chute 12. A coil spring 376, interposed between the head of the plunger 368 and the block or blocks 54 and 60, urges the plunger into a retracted position permitting a screw blank to move from the upper longitudinal channel of the guide chute into the transverse channel 56, as shown in Fig. 23.

The plunger 368 is formed at its outer end with a beveled cam face 378 adapted to engage the correspondingly beveled cam face 380 of the cam plate or bar 364 so that the plunger 368 may be operated by the cam bar 364 against the action of the spring 376 to cause an injection of the leading screw blank into the assembly wheel 266.

Safety means are provided for permitting the starter slide bar 366 to move independently of the cam bar 364 so that jamming of the injector mechanism 20 will not cause the breakage of the machine and will not interfere with the operation of the thread rolling dies 32 and 34, or with the oscillation of the transfer mechanism 14. This means may comprise a pair of pins or screws 382 carried by the slide bar 366 and received within longitudinal slots 384 in the cam bar 364. A coil spring 386, interposed between a shoulder 388 formed in the slide bar 366 and the upper end of the cam bar 364, urges the cam bar forwardly and normally retains it in such position that the pins 382 engage the upper or rear ends of the slots 384. The cam bar 364 and the spring 386 are mounted within a recess or groove 390 cut into the upper edge of the standard starter slide bar 366. If the plunger 368 becomes jammed for any reason, as for example by the presence of a screw blank in the assembly wheel slot 306 alined with the guide channel 56 (as shown in Fig. 25), the spring 386 will yield, as there shown, to permit independent movement of the slide bar 366. The slots 384 are each of a length sufficient to accommodate the full free movement of the starter slide bar 366 so that even if all movement of the cam bar 364 is prevented the starter slide bar will nevertheless be free to complete its full normal movement.

By the intermittent rotation of the assembly wheel 266, a screw blank injected into a slot 306 in the assembly wheel by the injector mechanism 20 is brought, after a number of successive operations, to a position A as shown in Fig. 17, in juxtaposition to the lower end of the washer guide chute 8. The bottom bar 158 of the guide chute 8 at its lower free end is centrally slotted as at 392 (Fig. 12) to receive the free end of the screw blank as it is moved by the assembly wheel from the position A of Fig. 17 to the position B in said figure. The slot 392 extends entirely through the bar 158 in the vertical direction so that, as the free end of the screw blank is moved to position B, it moves into the central opening in the leading lock washer and engages the forward edge of said central opening.

In the next intermittent movement of the assembly wheel the screw blank moves from position B to position C (Fig. 17), and in so moving extracts, by a force supplied in a direction longitudinally of the guide chute 8, the leading lock washer engaged by the screw blank in moving from position A to the position B.

Means are provided for preventing the lock washers from being thrown off the screw blanks and for insuring the positioning of the lock washers in juxtaposition to the outer periphery of the rim 288 of the assembly wheel 266. This means comprises a resilient cam and guide plate 393 and a pair of cam and guide bars 394 and 396 (Figs. 10, 11, 17 and 21). The plate 393 is secured, as by screws 397, to the guide bars 160 and 162 of the guide chute 8 and is bifurcated to provide spaced arms extending from the guide chute 8 and overlying the rim 288 of the assembly wheel 266. The cam and guide bars 394 and 396 are fixed to the bracket 256 and spaced apart a distance determined by the diameter of the screw blanks being assembled to provide a channel guide 398 receiving the shanks of the screw blanks. The resilient plate 393 and the bars 394 and 396 provide an arcuate cam surface 400 which is divided into two portions, one a portion 402 which is substantially concentric to the axis of the assembly wheel 266 and lies in close juxtaposition to the peripheral edge of the rim 288, and the other a portion 404 which is of constantly increasing radius, merging at its lower end with the portion 402 and extending outwardly along the forward side of the assembly wheel to the free edge of the guide chute 8. The bars 394 and 396 may be formed as the rearwardly projecting legs of a single fixed bracket, and preferably extend around a portion at least of the rearward half of the assembly wheel, as shown in Fig. 17, so as to insure the precise positioning of the screw blanks in the axially extending slots 306 of the assembly wheel. A second resilient, arcuate guide plate 405 (Fig. 17) may be secured to and depend from the bottom bar 158 of the guide chute 8 to receive the shanks of the screw blanks and thereby insure the proper alinement of the screw blanks with the slot 392 in the bottom bar of the guide chute 8 and with the central holes in the lock washers in said guide chute.

The concentric portion 402 of the cam face 400 of each bar 394 and 396 extends from the portion 404 to the opposite free end or edge 406 of the bar. The portion 404 of the cam surface 400 is adapted to engage the washers on the shanks of the screw blanks and, if the washers are tilted thereon or snugly engage the shanks of the screw blanks, rotate the washers so that each washer lies substantially perpendicular to the shank of its associated screw blank. The portion 404 of the cam surface 400 also forces each washer toward the periphery of the rim 288 of the assembly wheel so that as the washer is engaged by the concentric portion 402 of the cam surface it is substantially in contacting engagement with the outer peripheral surface of said rim 288, as shown in Fig. 21. It will also be evident that the concentric portion 402 of the cam face 400 additionally prevents movement of loose washers away from the rim 288 as the screw blanks are brought to the bottom of the assembly wheel.

The bar 394 lies in juxtaposition to the outer bar 46 and the guide chute 12 (see Fig. 24), and a sector is cut therefrom at its lowest point to provide an opening through which the screw blank may be injected into the assembly wheel from the channel 56 and through which the assembled blank and washer may be ejected from the assembly wheel into the channel 58. The portion of the bar 394 at the rear edge of this opening is inclined or beveled to form a cam surface 408 which, if the screw blank is not properly positioned in an axial recess 306, engages the shank of the screw blank as the assembly wheel rotates and forces the blank into proper position so that the shank of the screw blank projects into the guide channel 398 formed by the bars 394 and 396. The bar 394 at the forward edge of this opening is also inclined or beveled, forming a cam surface 410, which if a screw blank is tilted in its slot 306 when brought to the ejecting position, engages the shank of the blank as it is moved forward by the ejector 22 and properly alines the shank of such blank with the transverse channel 58 of the guide chute 12.

The ejector mechanism 22 for feeding the assembled screw blanks and washers from the assembly mechanism into the guide chute 12, comprises, as best shown in Figs. 17 to 24, a bar or plunger 412 slidably mounted on the bracket 256 and recessed along its upper edge to receive an edge of the lever or plate 324 and to form a shoulder 414 for operatively engaging a cam 416 secured to the edge of the lever or plate 324. The outer end of the bar or plunger 412 is provided with a slot 418 to receive a coil spring 420 which bears at one end against the plunger and at its other end bears against a finger or lug 422 fixed to the bracket 256 and extending into the slot 418 (Figs. 21, 23 and 24).

The finger or lug 422 may, however, be formed integrally with a plate 424, forming one wall of the housing in which the plunger is slidably mounted, the plate 424 being fixedly secured to the bracket 256. The spring 420 urges the plunger 412 forwardly through an opening 426 (Fig. 24) in the outer guide bar 396 and through the opening in the inner guide bar 394, as seen in Fig. 24, to eject the screw blanks, one by one, from the assembly wheel into the lower portion of the guide chute 12 through the transverse channel 58. A lug 428 (Figs. 18 to 21, 23 and 24) secured to or formed integrally with the bar 412, extends laterally therefrom in the direction of the pawl 320 and provides means which is operative in the event that the ejector mechanism becomes jammed to prevent movement of the assembly wheel by said pawl. If the bar 412 is prevented from moving forwardly its full distance, the lug 428 will overlie the pawl 320, as shown in Fig. 19, when this pawl is moved to its forward position, in which position it normally would engage the next ratchet tooth of the assembly wheel. The lug 428 therefore prevents the pawl 320 from engaging this next ratchet tooth, and hence operation of the pawl by the link 328 cannot effect the movement of the assembly wheel if the ejector mechanism becomes jammed, such for example, as might occur if a screw blank is held in the assembly wheel by other screw blanks filling the lower portion of the guide chute 12.

The cam 416 normally limits the feeding movement of the plunger 412 under the action of the spring 420, and also provides means for retracting the plunger against the force of said spring. This cam acts to return the plunger during the feeding movements of the pawl 320 (see Fig. 17) when the lever 324 is being rotated in a counter-clockwise direction by the crank 330 and link 328. The cam 416 permits feeding movement of the plunger under the action of the spring 420 during the non-feeding movements of the pawl 320 when the lever 324 is being rotated in a clockwise direction.

The operation of the assembly mechanism, the screw blank injector mechanism 20 and the screw blank and washer ejector mechanism 22 is as follows: The assembly wheel 266 is intermittently rotated by the shaft 332 through the crank 330, the link 328, and the pawl 320. In the initial position of the assembly wheel one of its axially extending slots 306 is in alinement with the transverse channel 56 in the guide chute 12, in which channel a screw blank has been positioned. The starter slide bar 366, as will subsequently appear, is operated in proper timed relation to the operation of the assembly wheel 266 so as to be moved forwardly when the assembly wheel is at rest. This forward movement of the starter slide bar 366 causes a corresponding forward movement of the cam bar 364 of the screw blank injector mechanism 20, and this cam bar, as previously described, operates the plunger 368 of said injector mechanism, which, upon operation, engages and moves the screw blank in the transverse channel 56 outwardly of said channel and into the alined receiving slot 306 in the assembly wheel. During the rearward movement of the starter slide bar the plunger 368 is moved by the spring 376 in the opposite direction to uncover the longitudinal channel of the guide chute 12, thereby permitting the next screw blank to move by gravity into the transverse channel 56.

The pawl 320 is moved in a counterclockwise direction by the shaft 332 after the screw blank has been positioned in the assembly wheel to bring the next following slot 306 into alinement with the transverse channel 56. After a certain number of intermittent operations of the assembly wheel, the screw blank is brought to the position A, in Fig. 17, where it underlies the guide chute 8. The next succeeding intermittent operation of the assembly wheel carries the screw blank to the position B, in which position, as previously described, the shank of the screw blank has been inserted in the central opening of the leading lock washer in the guide chute 8. The following intermittent operation of the assembly wheel carries the screw blank from the position B to the position C, and in so moving, the screw blank, as previously described, withdraws from the guide chute the lock washer into which the screw blank was projected at the position B. Subsequent operations of the assembly wheel carry the screw blank along the guide plate and bars 393, 394 and 396, and if the washer has not already, under the action of gravity, positioned itself in contacting engagement with the periphery of the rim 288 of the assembly wheel, the cam surface 400 will cause it to be positioned and so held.

The assembly wheel is finally brought to the position into which the assembled screw blank and washer are substantially in alinement with the transverse guide channel 58 in the lower portion of the guide chute 12. During the subsequent non-feeding movement of the pawl 320 the cam 416, which is in engagement with the shoulder 414 of the plunger 412, is moved forwardly, or downwardly as seen in Fig. 24, to permit the plunger to be moved axially with respect to the assembly wheel to engage the shank of the screw blank and move the assembled blank and washer through the transverse channel 58 into engagement with the curved end 68 of the spring strip 66, which spring applies a force to the shank of the screw blank in a direction to impel it longitudinally of the guide channel formed by the guide bar 44 and the lower portion 52 of the guide bar 46.

The cam 416, during the next movement of the lever 324 in a counterclockwise direction, causes the retraction of the plunger 412 against the force of the spring 420.

It should be noted that as the assembly wheel is brought into the position where the assembled blank and washer are in alinement with the transverse channel 58, the end portion 318 of the clamping lever 300 engages the fixed cam 314 and is rotated, as seen in Fig. 21, in a clockwise direction against the action of its spring 312, to thereby release the screw blank for movement by the ejector mechanism 22, as previously described.

*The transfer mechanism*

This modified transfer mechanism 14, as best shown in Figs. 1, 6, 7, 9, 24 and 26 to 31, cooperates with a guide chute 430 (Figs. 24 and 30) in transferring the assembled screw blank and washer from the bottom of the guide chute 12 to the thread-rolling dies. The guide chute 430 comprises a beveled guide block 432 (Fig. 9) having its beveled surface in alinement with the lower end of the bar 44 of the guide chute 12, and being secured to the auxiliary base 26 by any suitable bracket (not shown). A beveled cover plate 434 (Figs. 9, 24 and 30) is secured to the top surface of the block 432 and in a recess in the upper edge of the fixed guide bar 44 in horizontal alinement with the upper edge of the adjustable guide bar 46, and the beveled surface of the cover plate is in vertical alinement with the beveled surface of the guide block 432. The rear beveled surfaces of the fixed thread-rolling die 32, and a block 436, bolted or otherwise adjustably secured to the auxiliary base 26, cooperate with the guide block 432 and cover plate 434 in forming the guide chute 430, and the outer edge of the guide chute 430 is in longitudinal alinement with the outer edge of the die 32.

The standard transfer mechanism comprises a slide plate 438 mounted in guideways formed in a fixed supporting plate 440 secured to the auxiliary base 26. At its outer end the slide plate carries a cam roller 442 (Fig. 9) journaled on a stud 444, and the cam roller cooperates with the cam 446 secured to the underside of a reciprocating member or gate 448 which carries the thread-rolling die 34. Passing through an aperture in an upstanding portion of the slide plate 438 is a guide rod 450, and this rod is threaded at one end into an upstanding lug 452 of a casting 454 bolted to the supporting plate 440. A spring 456 surrounds the guide rod 450 and at its opposite ends bears against the lug 452 of the casting 454 and the upstanding portion of the slide plate 438. The spring 456 moves the slide plate inwardly and the cam 446 moves it outwardly against the action of said spring.

For locking the slide plate 438 against forward or inward movement against the action of the spring 456, a plunger 458 is provided, and this plunger is rotatably mounted in a boss 460 projecting from the surface of the slide plate. To the top of the plunger is fixed an operating knob 462 for rotating the plunger rod and moving the same upwardly against the action of a spring 464 mounted in an aperture in the boss 460 and plate 438. The spring 464 surrounds the body of the plunger and engages its opposite ends against the boss 460 and a shoulder formed by the enlarged head 466 of the plunger, which head is adapted to be inserted, in the rearward position of the slide plate, in an aperture 468 formed in the supporting plate 440. The plunger 458 is provided with a laterally extending pin 470 which is adapted to engage in one or the other of intersecting notches 472 and 474 (Figs. 6 and 7), which are cut into the boss 460 at right angles to each other, the notch 474 being of less depth than the notch 472. The pin 470 coacts with the notches 472 and 474 to hold the plunger rod in either of its settings.

An improved transfer and stop arm 476 (Figs. 9, 24 and 28 to 31), which is adapted to engage the shank of the screw blank beneath the washer, is resiliently mounted upon the slide plate 438 by the usual bracket 478 (Figs. 9 and 30). The transfer and stop arm 476 at its outer free end is enlarged to form an inclined, wedge-like face 480 (Figs. 24, 30 and 31), and at its other end is provided with a laterally extending lug or lugs 482, received in a recess 484 in the bracket 478, and pivoted to said bracket by a vertically extending pin 486 passing through the lug or lugs 482. A resilient strip or spring 488, secured at one end as by a screw 490 to the bracket 478, overlies the pivoted end of the stop arm 476 and normally retains this arm in the position shown in Fig. 30, in which position it is alined with a shank of a screw blank which is dropped into the guide chute 430 from the guide chute 12.

The bracket 478 is provided with a guide projection 492 (Fig. 9) which engages in a guide slot extending transversely of the slide plate 438, and the bracket 478 is secured to the plate 438 by a bolt 494 (Fig. 7), passing through an enlarged aperture in the bracket 478 for the purpose of permitting lateral adjustment of the bracket 478 and transfer arm 476 with regard to the slide plate.

A bell crank lever 496 (Figs. 7 and 9) is pivotally secured by a stud 498 to a rearwardly and outwardly extending arm of the bracket 478. The stud 498 is provided with a collar 500 (Fig. 7) of reduced diameter, about which is wound the convolutions of a spring 502, one end of the spring engaging a pin 504 carried at the lower end of the vertical arm of the bell crank, and the other end of the spring engaging a pin 506 (Fig. 9) mounted on the lower end of the bracket 478.

A transfer or register finger 508, which is adapted to rest on the top of the screw head during the forward stroke of the slide plate 438, is adjustably mounted in the horizontal arm of the bell crank 496. A stud 510, which secures the finger 508 to this horizontal arm, is provided with a flattened head 512 (Fig. 7), which latter receives a set screw 514. The set screw 514 projects beneath the head 512 to engage the bracket 478 and limit the downward movement of the horizontal arm of the bell crank, and consequently limit the downward movement of the transfer finger 508.

A set screw 516, threaded through a bracket 518 upstanding from the supporting plate 440, is adapted to engage the vertical arm of the bell crank to rotate said bell crank against the action of the spring 502 and thereby lift the register finger 508 to permit the foremost washer and screw blank unit in the guide chute 12 to move in front of the transfer and stop arm 476 when the slide plate 438 is in its rearward position.

Means 520 (Figs. 24 and 28 to 31) are provided for preventing the feeding of more than one unit from the guide chute 12 into the guide chute 430. This means preferably comprises a resilient strip or spring 522 mounted as by a screw 524 in a recess 526 cut in the guide bar 46 adjacent the bottom end of its lower portion 52. This strip 522 is normally held in the position shown in Figs. 30 and 31, wherein it engages the shanks of the leading two or three screw blanks and clamps these blanks against the guide bar 44. It is held in this position by a coil spring 528 (Figs. 28 and 29), acting through a lever 530. The lever 530 is pivoted intermediately on a pin 532, carried by a lug or lugs 534 formed on a plate 536, secured to the outer side of the guide bar 46 at the bottom of its lower portion 52.

The spring 528 is mounted within a housing formed by an opening in the plate 536 (Fig. 29) and bears at one end against said plate or against the guide bar 46 and at its other end against the lower end of the lever 530, which latter may, if desired, be provided with a rearwardly extending lug 538 to maintain the spring in proper position relative thereto. The upper end of the lever is provided with a rearwardly extending finger 540 projecting through a slot or opening in the plate 536 and through a slot or opening cut into the guide bar 46 transversely with respect to and in communication with the recess 526. The finger 540 is adapted to engage and move the spring strip 522 into the position, as shown in Figs. 30 and 31, or release the strip for outward movement into the recess 526, as shown in Fig. 24, in which latter position the leading washer and screw blank unit is free to move beyond the spring strip, to the lower end of the guide chute 12, and into the position in which its shank engages the upper side surface of the stop or transfer arm 476, as shown in the same figure.

In order to operate the lever 530 against the action of the spring 528 to permit release of the clamping strip 522, the slide bar 438 is provided with a resilient finger 542, secured to a bar or plate 544, bolted or otherwise fastened to the slide plate and projecting forwardly therefrom, as shown in Fig. 6. It will therefore be seen that as the slide bar 438 is moved by its operating spring toward the guide chute 12, the resilient finger 542 engages the lower end of the lever 530 and rotates it in a clockwise direction, as seen in Fig. 29, against the force of the spring 528 and out of engagement with the clamping strip 522.

In order to prevent transfer of washerless screw blanks along the guide chute 430 into the thread rolling dies from the guide chute 12, the bottom end of the lower portion 52 of the guide chute 46 is cut away, as at 546 (Figs. 24, 30 and 31), so that the bottom edge of this bar is above the outer edge of the beveled cover plate 434, and the end of the bar 46 is tapered, as at 548, to form with the end edge 546 and the end edge of the plate 536 one wall of a guide channel for directing a washerless screw blank from the guide chute 12 into a discharge channel or way 550. The other wall of this guide channel for directing a washerless screw blank into the discharge channel or way 550 is provided by a plate or strap 552 (Fig. 30), secured to the block 436 and extending over the transfer or stop arm 476. The strap 552 is formed with a beveled face 554, in effect forming the other wall of the guide channel which directs the washerless screw blank from the chute 12 to the discharge channel or way 550.

When a washerless screw blank reaches the bottom guide chute 12 and engages the upper side surface of the transfer or stop arm 476, the beveled face 480 at the end of this arm, during the outward movement of the slide plate 438, moves the blank to the position shown in Fig. 31, in which position it is in engagement with the end edge 546 of the guide bar 46 and in engagement with the beveled face 480 of the stop arm, the stop arm 476 being rotated about its pivot pin 486 against the force of the spring strip 488 so that its lower side surface comes into sliding engagement with the surface 556 of the block 436, as shown in Fig. 31. As the slide plate continues its outward movement the beveled face or portion 480 of the stop arm causes the screw blank to move along the way or channel formed by the edge 548 of the guide bar 46 and the beveled face or edge 554 of the strap 552, and into the discharge channel or way 550.

The discharge channel or way 550 may comprise an opening formed by a beveled block 557 and a plate 558 (Fig. 28), the block 557 being secured to the supporting plate 440 in abutting relation to the rear wall of an upstanding leg 559 (Figs. 1, 6, 9 and 28) of the auxiliary base 26, and the plate 558 being secured to the block 557. The way 550 extends into communication with the opening 560 (Fig. 9) between this leg 559 and a similar upstanding leg 562 of the auxiliary base. The washer or screw blanks which are dropped into the channel or way 550 roll or slide therealong into the opening 560 which extends to the lower end of the auxiliary base 26, and from this opening these washers or screw blanks drop into the rear end of a receptacle or pan 564 (Fig. 1), mounted on the main base 24 beneath and extending forwardly from the end of the auxiliary base 26.

Means 566 (Figs. 26 to 29) is provided for preventing the rejection of a screw blank with which is assembled a lock washer. This means may comprise a lever 568, pivoted by a stud 570 (Figs. 28 and 29) on a lug or boss 572 formed at the rear end of the plate 536, extending above and along the guide bar 46 and over the transfer or stop arm 476. The lower end of the lever 568 is extended laterally so as to overlie and extend beyond the cut away end of the guide bar 46. This lever is adjusted by means of a set screw 574 threaded through the lever 568 and extending therebeneath into engagement with the upper edge or surface of the guide bar 46, so that it is spaced from this surface such a distance that it will engage the head of a screw blank beneath which is positioned a washer, as shown in Figs. 26 and 28, but will permit substantially free movement of a washerless screw blank along the edge 546 as shown in Fig. 27. The spring 576, secured at one end to the lever 568 and at its other end to the plate 536, prevents upward camming of the lever by the head of a screw blank.

The operation of the transfer mechanism is as follows: As the reciprocating die 34 moves forwardly to roll the threads on the blank held between that die and the die 32, the beveled surface of the cam 446 engages the roller 442 and forces the slide plate 438 rearwardly against the action of the spring 456. In the rearmost position of the slide plate the forward edge of the transfer or stop arm 476 is in alinement with the inner edge or side surface of the adjustable guide bar 46. The register finger 508 having been rotated clockwise by the set screw 516, has been raised sufficiently to permit a screw blank and washer to gravitate into the guide chute 430, as seen in Fig. 30.

As the reciprocating die and the cam 446 move rearwardly, the spring 456 urges the slide plate 438 forwardly and the spring 502 forces the register finger 508 into tight engagement with the head of the screw blank and, the stop arm 476 being in engagement with the shank of the screw blank, the screw blank is moved longitudinally of the chute 430 to its proper position centrally of the space between the dies 32 and 34.

The transfer or stop arm 476 and the transfer or register finger 508 cooperate to maintain the screw blank in upright position, and during this transfer movement prevent the screw blank and washer unit, which has been released by the spring strip 522, from gravitating into the guide chute 430. It will be evident that one screw blank is released for movement by the spring strip 522 during each forward feeding movement or transfer operation of the slide plate 438.

The operation of the means 520 for rejecting washerless screw blanks, and the operation of the means 566 in preventing rejection of a screw blank with which has been assembled a lock washer, has been previously described.

*The thread rolling mechanism*

This mechanism (Figs. 1, 2, 6, 8, 9 and 30) comprises the reciprocating thread rolling die 34 and the immovable thread rolling die 32. The die 34 is mounted in a recess 578 (Fig. 9) in the inner face of the reciprocating member or gate 448, and is detachably secured thereto by clamping plates 580 and 582 and bolts 584 and 586 (Figs. 6 and 9). The immovable thread rolling die 32 is mounted in the block 436 which is adjustably mounted upon the upstanding leg 559 of the auxiliary base 26 by bolts 588 (Fig. 6), for adjustment toward and from the reciprocating die 34. A clamping plate 590 and bolt 592 detachably secure the immovable die 32 to the block 436. The reciprocatory member or gate 448 slides in a guideway formed by the inner depending flange 594 (Fig. 9) of a cover plate 596, a beveled insert or jib 598, and the inner face of the upstanding leg 562 of the auxiliary base, the cover plate 596 being secured, as by bolts 600 (Figs. 1 and 6), to said leg 562.

In view of the adjustability of the block 436 and the detachability of the thread rolling dies, various size dies with filler blocks may be employed to adapt the standard thread rolling mechanism for different sizes of screw blanks.

In passing through the thread rolling dies the surface of the screw blank is projected outwardly in proportion to the depth that the ribs of the thread rolling dies cut into the blank, and therefore the finished threaded screw becomes larger than the original blank, as shown in Figs. 39 and 40, and the outwardly projecting portions of the thread retain the lock washer 602 in assembled relation with the screw 604.

From the dies, the screw with the washer attached thereto falls by gravity into the receptacle or pan 564. In order to maintain separate the assembled units on which a thread has been formed from the washerless screw blanks falling into the pan from the central opening 560, the pan 564 may be provided with a partition 606 or, if desired, a separate receptacle or container may be placed in the standard pan 564, the receptacle for the blanks being, of course, located to the rear of the receptacle for the assembled units on which threads have been formed.

*The starter mechanism*

This starter mechanism 36 comprises the starter slide bar 366 (Figs. 1, 8, 17, 21, 23 to 25 and 30), which is mounted in guideways formed by the slide bar guide or bracket 374 and a cover or guide bar 608 (Figs. 6 and 8), which is secured to the bracket 374 and extends over the starter slide bar and the reciprocating member or gate 448. This guide bar or cover 608 is secured to the cover plate 596 by bolts 610. The slide bar 366 carries at its forward end a forwardly projecting stop finger 612 (Figs. 24 and 30), alined centrally of the space between the dies 32 and 34, and the lower edge of this finger is normally positioned a slight distance to the rear of the guide chute 430, as shown in Fig. 30.

The starter slide bar is operated by the sleeve 334 (Figs. 8 and 17), which is journaled on the shaft 332, through a slotted crank 614 (Fig. 8), into the slot of which projects a pivot stud 616 (Figs. 8 and 24) mounted on the rear end of the slide bar 366. In the standard machine the crank 614 is operated by a solid shaft journaled in bearings provided on opposite sides of the oil reservoir housing 92, and in adapting the machine to the present invention this solid shaft is replaced by the sleeve 334 and the shaft 332, the latter of which, as has been previously described, controls the movements of the assembly wheel 266.

The purpose of this starting mechanism is to assist the blanks to enter the dies, which, in conventional manner, are beveled inwardly at their rear ends to facilitate the insertion of such blanks. The starter slide bar 366 is also utilized to provide means for operating, in the manner previously described, the cam bar 364 which controls the operation of the screw blank injector mechanism 20. The forward movement of the starter slide bar 366 is limited by an adjustable set screw 618 (Fig. 6), threaded into the rear of the guide bar or cover plate 608 and engaging the slotted crank 614 to limit its forward rotation.

*The driving mechanism*

The driving mechanism 38 (Figs. 2 to 5 and 8) comprises a fly wheel 620 secured to the outer end of a shaft 622 journaled in an arm 624, projecting rearwardly and upwardly from the auxiliary base or casting 26, and the flywheel is driven by an electric motor 626 through the intermediacy of a belt 628. To the inner end of the shaft 622 is secured a gear 630 which meshes with a gear 632 secured to the inner end of a shaft 634, journaled in the arm 624. A pitman 636 is pivotally connected at one end to a disk 638, secured to the inner end of the shaft 634, and at its other end is pivotally connected to a pin 640 within a central opening in the reciprocatory member or gate 448 (Fig. 8).

On the outer end of the shaft 634 is secured the starter slide control cam 642, the pulley 644, and the gear 646, and a cam 648 for controlling the operation of the assembly mechanism is mounted on the shaft 634 between the cam 642 and the pulley 644 of the standard machine. The gear 646 meshes with a gear 650 mounted on the outer end of a shaft 652, journaled in a bracket fastened to the arm 624. A crank disc 654 is secured to the inner end of the shaft 652 and is connected by a link 656 to the reciprocating plate 72 of the screw blank feed mechanism 30.

The starter slide control cam 642 rotatably engages a cam roller 658 (Figs. 3 and 4) carried by a lever 660 which is pivoted by a pin 662 to the bracket in which is journaled the shaft 652. The lever 660 carries a block 664 which is apertured to receive a connecting rod 666, the latter being secured to the block by suitable nuts engaging the opposite surfaces thereof. The other end of the connecting rod 666 is pivoted to a crank 668, fastened to the outer end of the starter drive sleeve 334 (see Figs. 4 and 8). The cam roller 658 is maintained in engagement with the cam 642 and the lever 660 urged in a clockwise direction (see Fig. 4) to move the starter slide bar 366 forward, by a spring 670 connected at one end to said lever and at the other end to a lug projecting from a side of the fixed oil lubricating housing 92.

The shaft 90 which drives the screw blank clearing device 74, the washer feed mechanism 6, the washer clearing device 206, and actuates the hammer or lever 224, is driven by the pulley 644 through a belt 672 passing about the pulley 644 and about the pulley 674 (Fig. 2), secured to the outer end of the shaft 90. The shaft 332, which operates the assembly wheel 266 (Fig. 17), is operated by the cam 648 by means of a cam roller 676 (Figs. 3 and 5), secured to the free end of a lever or crank 678 fastened to the outer end of the shaft 332 (see Fig. 8). A spring 680, which is secured at one end to the lever 678 and at its other end to a fixed point on the auxiliary base, maintains the roller 676 in engagement with the cam 648 and urges the lever 678 in a counterclockwise direction, as seen in Fig. 5, to move the shaft 332 and crank 330 in a clockwise direction, as seen in Fig. 17, whereby to return the pawl 320 to its original position after each operation of the assembly wheel, the cam 648 positively actuating the shaft 332 and crank 330 in a counterclockwise direction, as seen in Fig. 17, to control the feeding movements of the pawl 320.

The operation of the driving mechanism is as follows: As the disk 638 rotates to move the reciprocatory member or gate 448 forwardly, and at the beginning of the forward movement, the cam roller 658 engages a portion of the cam 642 which is of less radius, and the spring 670, acting upon the lever 660, moves the connecting rod 666 and crank 668 forwardly to oscillate the sleeve 334 counterclockwise as seen in Figs. 2 and 4. Upon such counterclockwise oscillation of said sleeve, the crank 614 is oscillated forwardly to move the starter slide bar 366 forwardly whereby the starter finger 612, secured thereto, is moved forwardly to force the blank between the entering ends of the dies 32 and 34 (Fig. 24).

The shaft 332, which drives the assembly mechanism 10, is operated by the cam 648 in timed relation to the operation of the sleeve 334 which drives the starter slide bar 366 so that the assembly mechanism will be operated when the starter slide bar is in its rearmost position of rest, or is approaching such position, and so that the starter slide bar will operate the screw blank injector mechanism 20 when the assembly mechanism is at rest, or during the non-feeding movements of the pawl 320.

The operation of the driving mechanism to move the reciprocating feed plate 72 of the screw blank feeding mechanism 30; to rotate the screw blank clearing device 74; and to operate the feeding disk 148, the clearing device 206, and the impact member 224 of the washer feed mechanism, will be apparent from the above detailed description of this driving mechanism, and need not be repeated.

*Operation of the machine*

In the operation of the machine, screw blanks are fed from the hopper 28 by the reciprocating plate 72 and the clearing wheel 74 to the inclined guide chute 12. The reciprocating plate 72 and the clearing wheel 74 are continuously operated by the driving mechanism 38, in the manner previously described. The screw blanks pass down the channel of the inclined guide chute 12 under the action of gravity, and are delivered to the transverse channel 56, as shown in Figs. 23 to 25. The screw blank injector mechanism 20 is operated by the starter slide bar 366, and moves the screw blank in the channel 56 into the assembly mechanism 10.

Lock washers are fed from the hopper 4 (as shown in Figs. 10 to 16) by the feeding mechanism 6, including the feeding disk 148 and the clearing device 206, to the guide chute 8, down which the washers gravitate, the intermittently operated impact member 224 striking the chute and facilitating the free movement of the washers along this guide chute.

The assembly wheel 266 of the assembly mechanism 10 is intermittently rotated (as shown in Figs. 17 to 19) by its driving mechanism 18, which in turn is actuated by the driving mechanism 38. The assembly wheel 266, in the manner previously described (and as shown in Fig. 17), successively carries the screw blanks into engagement with the leading lock washer in the guide chute 8, and during the continued rotation of the assembly wheel the temporarily assembled units, each of which comprises a screw blank and a lock washer, are moved along the way or guide plate 393 and guide bars 394 and 396, the cam surface 400 causing the washers each to assume a position substantially in contacting engagement with the outer periphery of the rim of the assembly wheel. The assembled units are then brought by the assembly wheel into alinement with the bar 412 of the ejector mechanism 22 and the transverse channel 58 in the lower portion of the guide chute 12 (Figs. 21 to 24), and in moving to this position the fixed cam 314 engages and releases the clamping means 300 by which the alined blank had been clamped to the assembly unit.

The ejector mechanism 22, under the control of the assembly wheel drive mechanism 18, operates during the time that the assembly wheel is at rest, and during a non-feeding movement of the pawl 320, to move the alined blank with its associated washer out of the assembly mechanism and along the transverse guide channel 58, as shown in Figs. 21 to 24.

The spring strip 66 (Figs. 24 and 30) operates, as previously described, to apply a force to the shank of the screw blank moved thereagainst by the bar 412 of the ejector mechanism, which force is applied in a direction to impel the assembled unit along the longitudinal channel in the lower portion of the guide chute 12.

The assembled units now gravitate down the lower portion of the inclined guide chute 12 to the resilient clamping strip 522 (Figs. 24 and 28 to 31), which forms a part of the means 520 for controlling the feeding of the assembled units to the transfer guide chute 430. The transfer mechanism 14, under the control of the cam 446 carried by the reciprocatory member or gate 448, operates during the reverse movement of the reciprocatory die 34 to move successively the assembled units through the guide chute 430 into position between the reciprocatory die 34 and the immovable die 32.

If a washerless screw blank is fed to the guide chute 430, the transfer mechanism 14, in moving outwardly or backwardly, carries the washer or screw blank outwardly and drops it into the channel or way 550, from which it gravitates into the central opening 560 between the upstanding supporting legs of the auxiliary base, and in turn gravitates along the channel thus provided into the pan 564, or into a receptacle provided in the rear of said pan.

At the instant that the reciprocatory member or gate 448 begins to move forwardly to operate the die 34, the starter mechanism 36 is actuated by the spring 670 under the control of the cam 642 of the operating mechanism 38, so as to move the starter finger 612 forwardly into engagement with the shank of the screw blank, and this finger, in turn, pushes the assembled unit into tight engagement with the dies 32 and 34.

The rear edges of the dies 32 and 34 are beveled, as previously stated, for the purpose of facilitating this insertion of the shank of the screw blank between said dies. The reciprocatory die 34 moves forwardly a slight distance beyond the immovable die 32 so that the assembled unit, on which the threads have now been rolled, is carried beyond the end of the die 32 and dropped into the forward portion of the receiving pan 564, or into the receptacle mounted in the forward end of the pan.

In the modification of the assembly mechanism, shown in Figs. 32 to 38, the washers which have been assembled on the screw blanks are received within pockets 682 formed by ridges, ribs or lugs 684, formed on the outer periphery of the rim 288 of the assembly wheel 268, the pockets 682 being each of a depth substantially equal to the thickness of the washer.

The modified ejector mechanism 22', shown in these figures, includes means for rendering the mechanism inoperative to eject the screw blank if a washer has not been positioned thereon. This ejector mechanism 22' preferably comprises a solenoid 686, fastened to the bracket 256 of the assembly mechanism, the armature or movable core 688 of the solenoid being secured, as by a bolt 690, to a slide bar 692. The slide bar 692 is mounted in a guide 694 formed in the bracket 256, and is provided with a longitudinally extending slot 696 in which is mounted a lever 698 fulcrumed or pivoted to the slide bar by the pin or bolt 700.

A pusher plate or block 702 is secured to one end of the lever 698 and carries on its forward face a cam lug 704, which extends forwardly from the plate 702, the upper surface 706 of the lug 704 lying above the upper edge surface of the plate 702, as best shown in Fig. 37. The forward edge of the lug 704 is beveled to form the cam face 708, adapted to engage the shank of the screw blank as the assembly wheel is moved to direct the assembled unit into the forwardly inclined channel 710 in the lower portion of the main guide chute 12. The action of the cam lug 704 in injecting an assembled unit from the assembly wheel into said channel 710 is well illustrated in Figs. 34 and 35, in which it will be seen that as the screw blank is moved upwardly with respect to the guide chute 12, it engages the cam lug 704, which thereupon imparts to the screw blank a force impelling it to move in the opposite direction, namely in a direction downwardly of the guide chute 12.

A coil spring 712, mounted in a suitable opening in the slide bar 692 beneath the lever 698, engages the lever and applies thereto a force tending to rotate the lever in a clockwise direction, as seen in Figs. 32 and 33, and move the contact member 714, carried by the lever, into engagement with the contact 716, mounted on the bar 692. The contact 714 is adjustably secured to a laterally extending arm 718 of the lever 698, which arm overlies the slide bar 692. The contact 716 may be secured to and insulated from the bar 692 in any desired manner. The contacts 714 and 716 are connected by suitable leads or cables (not shown) in an energizing circuit for the winding of the solenoid 686.

A spring 720 (Fig. 34), secured at one end to the bar 692 and at the other end to a portion of the bracket 256, normally retains the slide bar 692 and the lever 698 in their forwarding ejecting position, as shown in Figs. 32, 34, 35 and 37. The solenoid 638, when energized in response to the closure of the contacts 714 and 716, moves the slide bar 692 with its lever 698 against the force of the spring 720, to the position shown in Fig. 36, in which position the cam lug 704 is out of the path of movement of the screw blank carried by the assembly wheel.

The lever 698 is normally retained in the position shown in Fig. 32 by the engagement of the upper surface of the cam lug 704 with the ribs or ridges 684 and with the washers in the receiving pockets 682. However, if there is no washer on the screw blank, the cam lug 704 is free to move into this pocket, and hence the spring 712 causes the lever 698 to rotate in a clockwise direction, as seen in Fig. 32, to the position shown in Fig. 33, thereby closing the contacts 714 and 716. The solenoid 686 is thereupon energized to withdraw the slide bar 692 with the lever 698 into the position shown in Fig. 36, in which position the screw blank will not be ejected from the assembly wheel, and consequently this screw blank will again be carried by the assembly wheel to the positions A, B and C of Fig. 17, to extract, in the manner previously described, the leading lock washer from the guide chute 8.

It should be noted that the slide bar 692 is held in its forward position solely by the spring 720, and consequently if the screw blank is held in the assembly mechanism by a full complement of units in the lower portion of the guide chute, the slide bar will itself be moved rearwardly by the screw blank in the assembly wheel so that the assembly wheel and its operating mechanism will not be injured by this jamming of the ejector mechanism.

In Figs. 41 to 45 a modified and simplified washer receiving hopper 722 and a modified and simplified washer feed mechanism 724 are disclosed. The washer hopper 722 and the washer feed mechanism 724 may, if desired, be substituted for the washer hopper 4 and the washer feed mechanism 6 shown in Figs. 1 to 31, with the consequent advantage, in addition to the advantages of simplicity, of greater ease of attachment to the standard thread rolling machine.

The washer hopper 722 comprises a casting having a rear wall 726, inwardly tapering or inwardly inclined opposed side walls 728 and 730 (Fig. 44) and a bottom wall 732 (Fig. 41). The hopper 722 is provided with laterally directed lugs or flanges 734 and 736 by which the hopper may be bolted or otherwise secured to a supporting plate 738 and to the laterally directed flange 740 of the casting 742 for the washer feed mechanism 724.

The opposed side walls 728 and 730 and the bottom wall 732 of the hopper are recessed or cut away to receive an oscillating feed plate or bar 744 and are provided with an integral depending flange portion 746 forming a guide for the rear surface of said plate 744.

The rear wall 748 of the casting 742 has secured thereto in any suitable manner a guide plate 750 for the forward surface of the feed plate 744. The feed plate 744 is pivoted for oscillation on a pin or bolt 752 by a sleeve 754, the bolt 752 passing through the depending flange portion 746 and through the rear wall 748 of the casting 742. The feed plate 744 is oscillated about its pivot by an eccentric 756 through an eccentric strap or link 758 having a universal connection, as by means of a knuckle or ball joint 760, to the feed plate 744. The eccentric 756 is journaled on a pin or stud 762 and fastened to a sprocket 764 also journaled on the stud 762. The sprocket 764 is connected by a chain 766 to a drive sprocket 768 journaled on the driving shaft 90 and keyed or otherwise fastened to the sheave 88. The stud 762 is secured to, and journaled in, the supporting plate 738 and is also journaled in a boss formed in the side wall 770 of a housing 772 for the sprocket, the chain and the eccentric, the housing being bolted to the supporting plate 738.

The forwardly projecting top wall 774 of the casting 742 is recessed to receive a plate 776, the upper surface of which is machined to a smooth finish to facilitate the ready movement of washers by gravity along such surface. A washer feed guide chute 778, comprising a bottom bar 780 and spaced side bars 782 and 784 bolted to the bottom bar, is secured to the wall 774 of the casting 742 and extends downwardly and forwardly therefrom to a position in juxtaposition to an assembly mechanism in the manner illustrated in Figs. 1 and 17.

The bottom bar 780 at its upper end is reduced in thickness and is received within a suitable slot or opening in the top wall 774 and the plate 776, extending substantially to the top edge of the plate 776. The side bars 782 and 784 of the guide chute extend along the top wall 774 and the plate 776 to a position in close juxtaposition to the periphery of a toothed and knurled clearing or feed control roller 786. The roller 786 is fastened to a shaft 788 journaled by a bushing 790 in the side wall 792 of the casting 742 and is journaled by a bushing 794 in the supporting plate 738. The shaft 788 is driven from the shaft 90 by the sprockets 796 and 798 and a sprocket chain 800. The sprocket 798 is secured to the end of the shaft 788 and the sprocket 796 is secured to a collar 802 pinned to a stud 804 received within an aperture in the shaft 90 and pinned thereto as at 806.

An impact member or hammer 808 is pivoted by a pin or screw 810 to the supporting plate 738 and is provided at its free end with a striker 812 which is preferably of hard rubber or like material, and is adapted to periodically strike or vibrate the guide chute 778 so as to facilitate the free movement of the washers along said chute under the action of gravity. The impact member or hammer 808 is periodically raised by a cam 814 secured to the collar 802 and engaging a pin or cam roller 816 secured to the member 808. The cam 814 is preferably so designed as to cause the impact member 808 to be raised twice during each revolution of the shaft 90.

An operating force is applied to the impact member or hammer 808 by means of a spring 818 wrapped around the pin 810, secured at one end to the member 808 and resting at the other end against the bar 782 of the guide chute.

When lock washers of the peripherally toothed type are to be fed to an assembling mechanism, the bottom and side bars of the guide chute 778 may be notched as at 820 (Fig. 43) to receive the teeth of the washers so that said teeth will not interfere with the entirely free movement of the washers along the guide chute.

The reciprocating or oscillating feed plate 744 has an upper, outer surface edge portion 822 extending generally radially relative to the axis of oscillation of said plate and an upper, inner edge portion or surface 824 extending away from said axis of oscillation and generally at an obtuse angle with respect to the radial edge portion 822. The edge portions 822 to 824, when thus formed, facilitate the picking up of washers by the reciprocating, oscillating plate 744 from the hopper 722 and, when said plate is in its uppermost position (shown in dotted lines in Fig. 45), cause the washers thus picked up to gravitate toward the guide chute 778. Upon each reciprocation of the plate 744 certain ones of the washers picked up thereby will be fed to the inclined top plate 776 in alinement with the entrance into the guide chute 778 and will accordingly enter said chute and be fed under the action of gravity therealong.

The clearing device or feed control roller 786 is rotated in a counterclockwise direction (as seen in Fig. 41) so that the knurled teeth of the roller will engage the washers deposited on the top plate 776 and thereby prevent escape of washers otherwise than along the guide chute 778 and also by agitation of the washers cause them to fall into the guide chute.

Means are provided for preventing washers which may adhere to the surface of the roller 786 from being thrown forwardly out of the feeding mechanism and this means comprises the bar 826 secured to and extending between the supporting plate 738 and the side wall 792 of the casting 742 and provided with a pad or strip 828 of felt or similar material also extending between said plate and said side wall. The strip 828 is secured to the bar 826 in any suitable manner and extends therebelow into engagement with the periphery of the clearing device or control roller 786.

Means are provided for adjustably supporting the hopper 722 and the feeding mechanism 724 upon the standard machine so that said hopper and said mechanism may be simultaneously adjusted for proper positioning and so that the guide chute 778 may be properly positioned with respect to an assembly mechanism to which the washers are to be fed by said guide chute. This means comprises a leg or bracket 830 formed integrally with the casting 742 and apertured at its lower free end to receive the pivot stud 80 by which it is mounted in a manner similar to that shown in Fig. 16 on the forwardly projecting arm 82 of the hopper casting 40. This mounting means also comprises a rearwardly extending bracket or arm 832 formed integrally with the housing 772, said bracket or arm having an arcuate slot 834 concentric to the axis of the stud 80 for receiving a bolt or the like 836 for securing the bracket to one wall of the hopper casting 40.

Tensioning means are provided for the sprocket chains 766 and 800 so as to maintain these chains in taut condition irrespective of the adjustment of the casting 742 and the hopper 722 by the stud 80. This means comprises idler sprockets 838 and 840 adjustably mounted in slots in the supporting plate 738.

The operation of the washer feed mechanism 724 in removing washers from the hopper 722 and depositing them in the guide chute 778 will be apparent from the above detailed description of the construction and operation of the several elements thereof.

In Figs. 46 to 54 of the drawings are shown modified forms of the injector and ejector mechanisms associated with the assembly mechanism. These modified forms of such mechanisms possess a substantial advantage in regard to their ease of assembly on the standard thread rolling machine and in that the modification or conversion of the standard machine to accommodate such mechanisms is still further reduced.

As shown in Fig. 46 and 49, the inner and outer guide bars 44 and 46 of the guide chute 12 are each cut in two sections, the inner guide bar sections being 842 and 844 and the outer guide bar sections being 846 and 848. These sections 842 to 848 are adjusted in their supporting brackets so that the plane of the top surfaces of the sections 844 and 848 lies below the plane of the top surfaces of the sections 842 and 846, and so that an opening 850 is formed between the sections 842 and 844 and an opening 852 is formed between the sections 846 and 848. The openings 850 and 852 provide a clearance space or way in which an injector mechanism 854 and an ejector mechanism 856 are adapted to operate to transfer a screw blank to the wheel 266 of the assembly mechanism 10 and to transfer an assembled blank and washer from such assembly mechanism to the lower portion of the guide chute 12.

The injector mechanism 854 comprises a pivoted element or lever 858 journaled on a pin 860 carried by the spaced lugs 862 of a bracket 864 in turn bolted to the guide bar or plate 258 upon which the bracket 256 for the assembly mechanism 10 is adjustably mounted (as shown in Fig. 17). The upper free end of the lever 858 is provided with a notch, recess or groove 866 in one edge, this recess or groove being of arcuate cross section, to receive, when the lever is in the dotted line position shown in Fig. 47, the leading screw blank in the upper sections of the guide chute 12.

An angulated plate 868 is secured to the upper end of the lever 858 by a pin 870, and is provided with a nose portion 872 which, when the lever is in the dotted line position shown in Fig. 47, projects into an aperture 874 cut into the supporting bracket 374 adjacent its upper edge.

An angulated guiding plate 876 is secured to the upper rear section 842 of the guide chute 12 to overlie the opening 850 between this upper rear section and the lower rear section 844. The laterally extending portion 878 of this angulated plate 876 extends into the assembly wheel 266 in a position overlying and within the rim 288 of said wheel (as shown in Fig. 47). This plate 876 forms a guide for the head and the upper portion of the shank of the screw blank adjacent said head during injection of the screw blank into the assembly wheel.

In order to properly position the screw blank in the assembly wheel, it is preferable to inject the blank thereinto in such manner that the axis of the blank extends radially with respect to the assembly wheel. Accordingly the lever 858 is pivoted on an axis which is tangential to a circle concentric with the assembly wheel and the arm of the lever extends radially with respect to said assembly wheel.

The lower end surface of the upper section 846 of the guide bar 46 is for the same reason beveled or tapered to extend radially with respect to the axis of the assembly wheel and therefore forms a guide engaging the shank of the screw blank during its injection into the assembly wheel. The notch or groove 866 in the lever 858 is deeper at its upper edge and the forward edge of the angulated plate 868 is cut away as at 882 so as to allow the blank to shift within the notch 866 as the lever moves from the dotted position in Fig. 47 to the full line position, in which latter position the screw blank is inserted in the assembly wheel in alinement with the channel 398 formed by the guide bars 394 and 396 so that the axis of the screw blank lies in a vertical plane parallel to the walls of said channel. The angulated plate 868 is extended above the upper edge of the lever 858 so as to assure this proper positioning of the screw blank in alinement with the channel 398. As the lever 858 is moved from the dotted line position in Fig. 47 to full line position in the same figure, the nose 872 of the angulated plate 868 closes the end of the upper section of the guide chute 12 and prevents movement of the succeeding screw blanks in the upper section of the guide chute during transfer of the leading blank into the assembly mechanism.

The ejector mechanism 856 comprises a bar or plunger 884 similar to the bar or plunger 412 of the ejector mechanism 22, shown in Figs. 1 and 17 to 24, but formed at its inner end with a beveled surface 886 to which is secured a block 888. The block 888 is formed to provide a notch, recess or groove 890 to receive the shank of a screw blank of an assembled unit, the base of the notch, recess or groove 890 extending radially with respect to the axis of the assembly wheel. The upper surface 892 of the block 888 extends beneath the outer periphery of the rim portion 288 of the assembly wheel (as shown in Fig. 52) and to support the washer of the assembled unit during its ejection from the assembly wheel and its transfer to the lower section of the guide chute 12. The ejector bar 884 may be operated by the cam 416 carried by the assembly wheel driving mechanism 18 in the manner shown in Figs. 17 to 24.

The injector mechanism 854 is, in this form of the invention, preferably operated by the ejector mechanism 856 and this is accomplished by extending the pin 870 carried by the lever 858 of the injector mechanism into the path of movement of the ejector bar 884 so that as the ejector bar is moved toward the guide chute 8 to carry an assembled unit being ejected from the assembly wheel into the guide chute 12, the lever 858 will be simultaneously moved toward the guide chute 12 into position to receive the leading blank from the upper section of said guide chute.

A coil spring 894, secured at one end to the pin 870 and at the other end to a pin 896 secured to the ejector bar 884, provides means for operating the injector lever 858 in the opposite direction simultaneously with the movement of the ejector bar 884 into a position to receive the next assembled unit carried by the assembly wheel. The spring 894 also provides a flexible link permitting the ejector bar 884 to be moved away from the guide chute 12 by its operating cam 416 (see Figs. 17 to 24) without damage thereto even if the injector mechanism becomes jammed for any reason whatsoever. The ejector bar 884 may be moved in the direction toward the guide chute 12 by a spring 420 such as shown in Figs. 21, 23 and 24, so that if either the injector mechanism or the ejector mechanism becomes jammed for any reason in its position shown in Fig. 50, the driving mechanism for the assembly wheel may, without breakage or abnormal stress, complete its normal cycle of movement.

It will be evident from the foregoing description that applicant has provided a fully automatic machine of relative simple and rugged construction for feeding washers and screw blanks from suitable hoppers, for assembling these blanks and washers substantially continuously and at a relatively high speed and, while retaining the screw blank and washer in assembled relation, rolling the threads thereon thereby to produce as an article of manufacture a permanent assembly of screw and washer. It will be further evident that applicant has provided simple and efficient mechanisms for association with the standard screw thread-rolling machine, whereby such standard machine can be employed automatically to produce permanent unit assemblies of screws and lock washers when supplied with screw blanks and lock washers.

Changes may be made in the form, construction, and arrangement of the several parts without departing from the spirit of the invention or sacrificing any of its numerous advantages, and the right is hereby reserved to make all such changes as fairly fall within the scope of the following claims.

The invention is hereby claimed as follows:

1. The method of assembling a screw element having a clamping head with a washer element, which comprises conveying a washer element along a predetermined path to a predetermined position, conveying a screw element along a predetermined path in such manner that while moving along said path the screw element passes through the hole of the washer to engage and cause the washer to move from its predetermined position with the screw element as a temporarily assembled unit, maintaining the washer in assembled relation with the screw element and while so maintained enlarging the screw element at a point beyond the washer so that the outside diameter of the screw element at said point exceeds the diameter of the hole in the washer thereby permanently to retain the washer and screw element in assembled relation.

2. The method of assembling a screw element having a clamping head with a lock washer element, which comprises discharging a lock washer element from a mass of such elements, feeding the washer element along a predetermined path to a predetermined position, discharging a screw element from a mass of screw elements, conveying the screw element along a predetermined path in such manner that while moving along said path the screw element passes through the hole in the washer to engage and cause the washer to move from said predetermined position with said screw element as a temporarily assembled unit, maintaining the washer element in assembled relation in juxtaposition to the head of the screw element and while so maintained forming on the screw element beneath the washer element threads having an outside diameter exceeding the diameter of the hole in the washer thereby securing the washer and screw element in assembled relation.

3. The method of assembling a screw having a clamping head with a washer, which comprises massing a quantity of washers, massing a quantity of screw blanks, discharging the washers from the mass, feeding the discharged washers in a continuous lineal succession to a predetermined position, discharging the screw blanks from the mass of such blanks, feeding the screw blanks in a continuous succession along a predetermined path in such manner that while moving along said path each blank in succession passes through the hole in the leading washer at said predetermined position and causes the washer to move with the blank as a temporarily assembled unit, maintaining the washers in assembled relation in juxtaposition to the heads of the screw blanks and while so maintained successively forming on the screw elements, beneath the washers, threads having an outside diameter greater than the hole in the washers, thereby permanently to retain each washer in assembled relation with a screw.

4. The method of assembling a screw element having a clamping head with a washer element, which comprises feeding the washer element in a given path, feeding the screw element along an arcuate path intersecting the path of movement of said washer in such manner that the free end of the shank of the screw element passes through the hole in the washer to engage and cause the washer to move with the screw element as a temporarily assembled unit, maintaining the washer in assembled relation with the screw element and while so maintained forming on the screw element beneath the washer threads having an outside diameter exceeding the diameter of the hole in the washer thereby permanently to retain the washer and screw element in assembled relation.

5. The method of assembling a screw element having a clamping head with a washer element, which comprises feeding the washer element to a predetermined position, feeding the screw blank along a predetermined arcuate path lying in a plane common to the axis of the washer at said predetermined position in such manner that while moving along said arcuate path the screw element passes through the hole of the washer to engage and cause the washer to move from said predetermined position with the screw element as a temporarily assembled unit, maintaining the washer in assembled relation with the screw element and while so maintained forming on the screw element beneath the washer threads having an outside diameter exceeding the diameter of the hole in the washer thereby to secure the washer and screw element in assembled relation.

6. The method of assembling a screw blank having a clamping head with a lock washer which comprises massing a quantity of screw blanks, massing a quantity of lock washers, discharging screw blanks from the mass in a continuous lineal succession, discharging lock washers from the mass of lock washers in a continuous lineal succession, successively selecting the leading blank from the line of blanks, conveying said selected blank along a predetermined path intersecting the line of lock washers in such manner that while moving along said path the shank of the screw blank passes through the hole of the leading washer of the line of washers to engage and cause such washer to move with the screw element as a temporarily assembled unit, maintaining the washer in assembled relation and while so maintained forming on the screw element beneath the washer threads having an outside diameter exceeding the diameter of the hole in the washer thereby to secure the washer and screw element in assembled relation.

7. The method of assembling a screw blank having a clamping head with a lock washer which comprises massing a quantity of screw blanks, massing a quantity of lock washers, discharging screw blanks from the mass in a continuous lineal succession, rejecting screw blanks discharged from the mass of screw blanks otherwise than along said lineal path, discharging lock washers from the mass of lock washers in a continuous lineal succession, successively selecting the leading blank from the line of blanks, conveying said selected blank along a predetermined path intersecting the line of lock washers in such manner that while moving along said path the shank of the screw blank passes through the hole of the leading washer of the line of washers to engage and cause such washer to move with the screw element as a temporarily assembled unit, maintaining the washer in assembled relation and while so maintained forming on the screw element beneath the washer threads having an outside diameter exceeding the diameter of the hole in the washer thereby to secure the washer and screw element in assembled relation.

8. The method of assembling a screw blank having a clamping head with a lock washer which comprises massing a quantity of screw blanks, massing a quantity of lock washers, discharging screw blanks from the mass in a continuous lineal succession, discharging lock washers from the mass of lock washers in a continuous lineal succession, rejecting washers discharged from the mass otherwise than along said lineal path, successively selecting the leading blank from the line of blanks, conveying said selected blank along a predetermined path intersecting the line of lock washers in such manner that while moving along said path the shank of the screw blank passes through the hole of the leading washer of the line of washers to engage and cause such washer to move with the screw element as a temporarily assembled unit, maintaining the washer in assembled relation and while so maintained forming on the screw element beneath the washer threads having an outside diameter exceeding the diameter of the hole in the washer thereby to secure the washer and screw element in assembled relation.

9. The method of feeding screw blanks and washers to a thread rolling mechanism for the production of permanently assembled screw and washer units which comprises conveying each washer along a predetermined path to a predetermined position, conveying each screw element along a predetermined path in such manner that while moving along said path the shank of the screw blank passes through the hole of the washer to engage and cause the washer to move from said predetermined position with said screw blank as a temporarily assembled unit, transferring the temporarily assembled units in succession along a given path to said thread rolling mechanism and directing any washerless screw blank which may reach said given path away from the thread rolling mechanism.

10. The method of feeding screw blanks and washers to a thread rolling mechanism for the production of permanently assembled screw and washer units which comprises conveying each washer along a predetermined path to a predetermined position, conveying each screw element along a predetermined path in such manner that while moving along said path the shank of the screw blank passes through the hole of the washer to engage and cause the washer to move from said predetermined position with said screw blank as a temporarily assembled unit, transferring the temporarily assembled units in succession along a given path to said thread rolling mechanism, directing any washerless screw blank which may reach said given path along a different path away from the thread rolling mechanism, and preventing the movement of any screw blank upon which a washer has been positioned into said different path.

11. The method of feeding screw elements and washer elements to a mechanism for temporarily assembling the blanks with the washers and for feeding the screw blanks and washers to a thread rolling mechanism for the production of permanently assembled screw and washer units, which comprises conveying each screw element to a predetermined position in juxtaposition to the assembly mechanism, conveying each washer element to a predetermined position in juxtaposition to the assembly mechanism, injecting one of said elements into said assembly mechanism, causing the injected element in moving through the assembly mechanism to withdraw the other element from its said predetermined position in temporarily assembled relation with the injected element, ejecting the temporarily assembled unit from the assembly mechanism, feeding the ejected unit to the thread rolling mechanism and causing the injected element to remain in the assembly mechanism if in a complete movement of the assembly mechanism the elements are not brought into assembled relation.

12. The method of assembling a screw element having a clamping head with a lock washer, which comprises feeding the washer along a predetermined path to a predetermined position, feeding the screw element bodily along a predetermined path extending transversely with respect to the axis of the screw element, while holding the screw element against movement longitudinally of its axis, directing the free end of the shank of the screw element while moving along said predetermined path into the hole of the washer and into engagement therewith to cause the washer to move as a unit with the screw element and thereafter pressing the washer and screw element relatively in an axial direction to position the washer adjacent the head of the screw element.

13. The method of assembling a screw element having a clamping head with a lock washer, which comprises feeding the washer along a predetermined path to a predetermined position, feeding the screw element bodily sidewise along a predetermined arcuate path while holding the screw element against endwise movement radially of said arcuate path, directing the free end of the shank of the screw element while moving along said path into the hole of the washer and into engagement therewith to cause the washer to move as a unit with the screw element and thereafter pressing the washer and screw element relatively in an axial direction to position the washer adjacent the head of the screw element.

14. Attachments for a thread rolling machine having a hopper for screw blanks, thread rolling mechanism and means for conveying screw blanks from said hopper to said thread rolling mechanism, said attachments comprising a mechanism for assembling screw blanks and washers, a washer hopper receiving a random mass of washers, means for feeding washers from the mass in the hopper in individual succession to the assembly mechanism, means for withdrawing screw blanks from the screw blank conveying means and feeding the same into said assembly mechanism and means for returning the blanks assembled with washers to said conveying means.

15. Attachments for a thread forming machine having a hopper for screw blanks, a thread forming mechanism, means for conveying screw blanks from the hopper to the thread forming mechanism, and a driving mechanism for actuating said thread forming mechanism, said attachments comprising a mechanism for assembling screw blanks with washers, a hopper for washers, means for feeding washers from the hopper to said assembly mechanism, transfer means for injecting screw blanks from the screw blank conveying means into said assembly mechanism, transfer means for ejecting screw blanks assembled with washers from said assembly mechanism and for returning said assembled blanks and washers to said conveying means, and driving means adapted to connect the driving mechanism of the machine to said assembly mechanism.

16. Attachments for a thread forming machine having a hopper for screw blanks, a thread forming mechanism, a screw blank conveying means for feeding the blanks to the thread forming mechanism, driven means for discharging blanks from the hopper to said conveying means and a driving mechanism for actuating said thread forming mechanism and said driven screw blank discharging means, said attachments comprising a mechanism for assembling the screw blanks with washers, a washer receiving hopper, a conveyor for carrying washers to said assembly mechanism, means for discharging washers from the hopper to said washer conveyor, means for withdrawing screw blanks from the screw blank conveying means and injecting them into said assembly mechanism, means for ejecting assembled washers and screw blanks from said assembly mechanism and returning said assembled blanks and washers to said screw blank conveying means, and driving connections between the driving mechanism, said assembly mechanism and said washer discharging mechanism.

17. In a machine for producing assembled screw and washer units, a thread rolling mechanism, means for feed screw blanks to said mechanism, screw and washer assembly means, means in advance of the thread rolling mechanism for transferring blanks from said feeding means to said assembly means and for transferring the assembled blanks and washers from the assembly means to the feeding means, and means for actuating said thread rolling mechanism to form threads on the blanks beneath the washers, thereby permanently to secure the washers on the screws.

18. Means for converting a thread rolling machine, having a thread rolling mechanism, and means for feeding screw blanks to said thread rolling mechanism, into a machine for producing assembled screw and washer units, said converting means comprising transfer means in advance of the thread rolling mechanism for withdrawing screw blanks from said feeding means, an assembly mechanism receiving the withdrawn blanks for assembling said blanks with washers and transfer means for returning the blanks with washers thereon to said feeding means beyond the point of withdrawal but in advance of said thread rolling mechanism.

19. In a machine for assembling screw and washer units, a mechanism for assembling screw elements and lock washers, means for feeding screw elements into said assembly mechanism, a hopper for receiving a mass of washers, a gravity chute for feeding lock washers to a point in juxtaposition to said assembly mechanism, a rotary member in said hopper and constructed to feed washers successively to said chute, and means included in said assembly mechanism for causing each screw element to receive a lock washer at said point and to position the washer adjacent the head of the screw element.

20. In a machine producing assembled screw and washer units, a hopper for screw blanks, a second hopper receiving a random mass of lock washers, an assembly mechanism, means for feeding screw blanks from the first hopper into the assembly mechanism, means for feeding lock washers from the second hopper to a point in juxtaposition to the assembly mechanism, means included in said assembly mechanism for causing the shank of each screw blank to receive a lock washer at said point and to position the washer adjacent the head of said screw blank, means for ejecting the assembled washers and blanks from said assembly mechanism, a thread rolling mechanism and means receiving the assembled washers and blanks from the ejecting means for feeding the assembled screw blanks and washers to the thread rolling mechanism.

21. In a machine for producing assembled screw and washer units, a hopper for screw blanks, a second hopper for lock washers, an assembly mechanism, means for feeding the screw blanks in individual succession from the first hopper to the assembly mechanism, means for feeding the lock washers in individual succession from the second hopper to a point in juxtaposition to the assembly mechanism, means included in said assembly mechanism for causing the shank of each screw blank to pick up a lock washer at such point and to position the washer adjacent the head of the screw blank, means for ejecting the assembled screw blanks and washers in succession from said assembly mechanism, a thread rolling mechanism, and means for feeding the ejected screw blanks and washers in succession to said thread rolling mechanism.

22. In a machine for producing assembled screw and washer units, a mechanism for assembling screw blanks and washers, an inclined guide chute having an upper portion for feeding screw blanks to said assembly mechanism and a lower portion for feeding screw blanks from said assembly mechanism, means for injecting the foremost screw blank on the upper portion of the guide chute into said assembly mechanism, means for feeding lock washers to a point in juxtaposition to said assembly mechanism, means included in said assembly mechanism for causing the shank of the injected screw blank to receive a lock washer at said point and to move the washer toward the head of said screw blank, means for ejecting the assembled blank and washer from the assembly mechanism onto the lower portion of said guide chute and a thread rolling mechanism receiving the assembled blanks and washers from the lower portion of said guide chute for forming on the shank of the screw blank beneath the washer threads having an outside diameter exceeding the diameter of the hole in the washer, thereby permanently to secure the washer on the screw.

23. In a machine for producing assembled screw and washer units, an assembly wheel, wheel, means for feeding screw blanks into said assembly wheel, means for conveying washers to a point in juxtaposition to said assembly wheel for reception on the screw blanks therein, means for conveying assembled screw blanks and washers from the assembly wheel, a thread rolling mechanism comprising a movable die and a stationary die, and a transfer mechanism for moving each assembled screw blank and washer unit from said last mentioned conveying means to the thread rolling mechanism with the washer in contact with the outer surfaces of the dies so that it bridges the space between them and with the shank of the screw blank between said dies, and means for actuating the dies to roll a thread on the shank of the screw blank while the washer is carried by the dies.

24. In a machine for assembling screw and washer units, a mechanism for assembling screw elements and lock washers, means for injecting screw elements into said assembly mechanism, means for conveying lock washers to said assembly mechanism, means included in said assembly mechanism for causing the shank of each screw element to be inserted into the hole in a lock washer and to position the washer adjacent the head of said screw element, means for ejecting the assembled screw elements and lock washers from the assembly mechanism, and means operatively associated with said assembly mechanism for separating assembled units from screw elements which the assembly mechanism fails to assemble with washers.

25. In a machine for producing assembled screw and washer units, an assembly mechanism, means for feeding screw blank elements and washer elements to predetermined positions adjacent said assembly mechanism, means for injecting elements of one kind into said assembly mechanism from its feeding means, means included in said assembly mechanism for causing each of the injected elements to engage and withdraw an element of the other kind from its predetermined position and to position the washer element adjacent the head of the screw element, a thread rolling mechanism, and means for feeding the assembled screw blank and washer units from said assembly mechanism to said thread rolling mechanism.

26. In a machine for producing assembled screw and washer units, an assembly mechanism, means for feeding screw blank elements and washer elements to predetermined positions adjacent said assembly mechanism, means for injecting elements of one kind into said assembly mechanism from its feeding means, means included in said assembly mechanism for causing each of the injected elements to engage and withdraw an element of the other kind from its predetermined position and to position the washer element adjacent the head of the screw element, a thread rolling mechanism, means for ejecting the assembled screw blanks and washers from said assembly mechanism and means for conveying the ejected screw and washer units to said thread rolling mechanism.

27. In a machine for producing assembled screw and washer units, an assembly mechanism, means for feeding screw blank elements and washer elements to predetermined positions adjacent said assembly mechanism, means for injecting elements of one kind into said assembly mechanism from its feeding means, means included in said assembly mechanism for causing each of the injected elements to engage and withdraw an element of the other kind from its predetermined position and to position the washer element adjacent the head of the screw element, a thread rolling mechanism, means for ejecting the assembled screw blanks and washers from said assembly mechanism, means for conveying the ejected screw and washer units to said thread rolling mechanism, said conveying means including a gravity feed guide chute, a transfer mechanism for moving the assembled screw blank and washer units in succession from said feed chute to said thread rolling mechanism, and means operatively controlled by the transfer mechanism for feeding the assembled units one by one from the feed chute to said transfer mechanism.

28. Washer feeding means comprising a hopper for receiving such washers, a gravity feed chute for conveying the washers to a point of use, means for discharging washers from said hopper, means including a rotary feed plate having an annular recess tangent to the channel of the gravity feed chute for receiving the discharged washers and for feeding the discharged washers into the said feed chute.

29. Washer feeding means comprising a hopper for receiving such washers, a gravity feed chute for conveying the washers to a point of use, means for discharging washers from said hopper, means including a rotary feed plate having an annular recess tangent to the channel of the gravity feed chute for receiving the discharged washers and for feeding the discharged washers into the said feed chute, and means for preventing washers not positioned in said annular recess from being fed into said guide chute.

30. Washer feeding means comprising a hopper for receiving such washers, a gravity feed chute for conveying the washers to a point of use, means reciprocating in said hopper for discharging washers therefrom, and means including a rotary feed plate having an annular recess tangent to the channel of the gravity feed chute for receiving the discharged washers and for feeding the discharged washers into the said feed chute.

31. Washer feeding means comprising a hopper for receiving such washers, a gravity feed chute for conveying the washers to a point of use, means for discharging washers from said hopper, means including an inclined plate for receiving washers discharged from said hopper and for directing the washers into said gravity feed chute, a fixed support, and common means for adjustably mounting said hopper and said gravity feed chute on said fixed support.

32. Washer feeding means comprising a hopper for receiving such washers, a gravity feed chute for conveying the washers to a point of use, means for discharging washers from said hopper, means including an inclined plate for receiving washers discharged from said hopper and for directing the washers into said gravity feed chute, a fixed support, and means mounting said gravity feed chute on said fixed support for angular adjustment to vary the angle of inclination of said gravity feed chute.

33. Washer feeding means comprising a hopper for receiving such washers, a gravity feed chute for conveying the washers to a point of use, means for discharging washers from said hopper, means including an inclined plate for receiving washers discharged from said hopper and for directing the washers into said gravity feed chute, and an impact member for periodically striking said gravity feed chute to facilitate the free movement of the washers therealong.

34. Washer feeding means comprising a hopper for receiving such washers, a gravity feed chute for conveying the washers to a point of use, means for discharging washers from said hopper, means, including a rotary member positioned adjacent the entrance end of said gravity feed chute, for receiving said discharged washers and for directing the same into said gravity feed chute, and means adjacent the periphery of said rotary member for preventing the escape of washers adhering to the surface of said rotary member.

35. In combination, a rotary wheel having a rim portion in which there is provided an opening to receive the shank of a screw element, means for injecting a screw element into said opening, means for feeding a washer element to a predetermined point in juxtaposition to the rim of said wheel, means for rotating said wheel to cause the shank of the screw element to pass through the hole of the washer at said predetermined point and to withdraw the washer from said point as the wheel is rotated, and means causing the picked up washer to be shifted axially of the screw element into a position adjacent the head of said screw element.

36. In combination, a rotary wheel having a hollow rim portion, said rim portion having an opening to receive a screw element, means for injecting a screw element into said opening, said means comprising a spring operated pusher, means for conveying a washer element to a predetermined point in juxtaposition to the rim of said wheel, means for rotating said wheel to cause the shank of the screw element to pick up the washer at said point, and means for shifting the washer axially of the screw element to a position adjacent the head of said screw element.

37. In combination, a rotary wheel having a hollow rim portion, said rim portion having an opening to receive a screw element, means for injecting a screw element into said opening, said means comprising a spring operated pusher, means for conveying a washer element to a predetermined point in juxtaposition to the rim of said wheel, means for rotating said wheel to cause the shank of the screw element to pick up the washer at said point, means for shifting the washer axially of the screw element to a position adjacent the head of said screw element, and means for controlling the operation of said pusher in proper timed relation to the rotation of said wheel.

38. In combination, a rotary wheel having a hollow rim portion, said rim portion having an opening to receive a screw element, means for injecting a screw element into said opening, means for conveying a washer element to a predetermined point in juxtaposition to the rim of said wheel, means for intermittently driving said wheel to cause the shank of the screw element to receive the washer at said point, means for shifting the washer axially of the screw element to a position adjacent the head of said screw element, means for driving said injecting means and means for causing said driving means to operate independently of said injecting means if the operation of said injecting means is prevented.

39. In a machine for producing assembled units of screws and washers, thread rolling mechanism, means for feeding screw blanks and washers as temporarily assembled units to said thread rolling mechanism, and means for diverting washerless screw blanks fed toward said mechanism by said feeding means away from said thread rolling mechanism.

40. In a device of the character described, a mechanism for assembling a screw element with a washer comprising a rotary member having an opening adapted to receive a screw element with its shank extending radially beyond the periphery of said member, means for positioning a washer on the free end of the extending shank of said screw element as said member is rotated, and means engaging the washer positioned on said screw element for shifting the washer axially toward the head of the screw element.

41. In a device of the character described, a mechanism for assembling a headed screw element with a washer comprising a rotary member having an opening adapted to receive a screw element with its shank extending radially beyond the periphery of said member, means for positioning a washer on the free end of the extending shank of said screw element as said member is rotated, and means engaging the washer positioned on said screw element for causing axial movement of the washer inwardly along the shank of the screw element to a position adjacent the head of the screw element as the member is rotated.

42. In a device of the character described, a mechanism for assembling a screw element with a washer comprising a rotary member having an opening adapted to receive a screw element with its shank extending radially beyond the periphery of said member, means for positioning a washer on the free end of the extending shank of said screw element as said member is rotated, and means having an arcuate surface extending peripherally of said rotary member for engaging and shifting the washer positioned on said screw element into juxtaposition to the head of said element.

43. In a device of the character described, a mechanism for assembling a screw element with a washer comprising a rotary member having an opening adapted to receive a screw element with its shank extending radially beyond the periphery of said member, means for positioning a washer on the free end of the extending shank of said screw element as said member is rotated, and means comprising spaced cam surfaces extending peripherally of said rotary member for engaging and shifting the washer positioned on said screw element toward the head of said element as said member is rotated.

44. A washer feed chute for lock washers of the warped tooth type comprising means forming a channel for receiving the washers and having a bottom wall and opposed side walls, the corners formed by the intersection of each side wall and the bottom wall being notched to receive the teeth of the washers to permit the body of the washers to rest upon the bottom wall and move freely along said channel without interference from the teeth of the washers.

45. A washer feed chute for lock washers of the warped tooth type comprising means forming a channel for receiving the washers and having a bottom wall and opposed side walls and a top wall, corners formed by the intersection of said side wall with a bottom wall and a top wall being notched to receive the teeth of the washer to permit the body of the washer to slide freely between the top and bottom walls without interference from the teeth of the washer.

46. In a device of the character described, a wheel for assembling screw elements with washers, said wheel having alined means for receiving screw elements to be assembled, means for feeding washers to a predetermined point in juxtaposition to said assembly wheel, and means for rotating said assembly wheel, causing each of the screw elements to pick up a washer positioned at said predetermined point, said washer feed means comprising a washer feed chute, a fixed support, and means for mounting said chute on said support for rotary adjustment about an axis parallel to the axis of said assembly wheel and for adjustment along said parallel axis whereby to aline the discharge end of said chute with the screw element receiving means of said assembly wheel and to position said end of the washer feed chute at said predetermined point.

47. Washer supplying means comprising a washer receiving hopper, a supporting member for said hopper, said supporting member having a plane surface inclined downwardly from a wall of the hopper, means for discharging washers from the hopper onto said plane surface for movement by gravity thereon, and an inclined washer feed chute carried by said supporting member for receiving washers from said inclined plane surface.

48. Washer supplying means comprising a washer receiving hopper, a supporting member for said hopper, said supporting member having a plane surface inclined downwardly from a wall of the hopper, means for discharging washers from the hopper onto said plane surface for movement by gravity thereon, an inclined washer feed chute carried by said supporting member for receiving washers from said inclined plane surface, a fixed support, and means for mounting said supporting member on said fixed support for angular adjustment to vary the inclination of the said inclined plane surface and said feed chute.

49. Washer supplying means comprising a washer receiving hopper, a supporting member for said hopper, said supporting member having a plane surface inclined downwardly from a wall of the hopper, means for discharging washers from the hopper onto said plane surface for movement by gravity thereon, an inclined washer feed chute carried by said supporting member, and means for directing washers from said inclined plane surface into said washer feed chute.

50. Washer supplying means comprising a washer receiving hopper, a supporting member for said hopper, said supporting member having a plane surface inclined downwardly from a wall of the hopper, means for discharging washers from the hopper onto said plane surface for movement by gravity thereon, an inclined washer feed chute carried by said supporting member, and means for directing washers from said inclined plane surface into said washer feed chute, said means comprising a disk-like member in the plane of said inclined plane surface.

51. A mechanism for assembling screw elements with washers comprising a rotary member for receiving screw elements, means for feeding washers to a predetermined point in juxtaposition to said rotary member, means for driving said rotary member to cause each screw element to pick up a washer at said predetermined point, means for ejecting the assembled units of screw elements and washers from said rotary member, and means operatively connected to said ejecting means for preventing operation of said rotary member by said driving means if full movement of the ejecting means is prevented.

52. In a device of the character described for rolling threads on screw blanks, comprising thread rolling dies, a feed chute for feeding screw blanks in a line, said feed chute having its discharge end spaced from said thread rolling dies, means receiving screw blanks from said feed chute for transferring said blanks to said thread rolling dies, and means operatively controlled by said transferring means and engaging the foremost blank of the line of blanks in said feed chute for preventing the discharge of more than one blank at a time from said chute into said transfer means.

53. In combination, a mechanism for assembling screw and washer elements, means for injecting one of said elements into said assembly mechanism to receive the other of said elements, means for ejecting assembled units from said assembly mechanism, means for driving one of said means, and means operatively connecting said ejecting and injecting means for simultaneous operation by the driven one of said means.

54. In combination, a mechanism for assembling screw and washer elements, means for injecting one of said elements into said assembly mechanism to receive the other of said elements, means for ejecting assembled units from said assembly mechanism, means for driving one of said means, and means operatively connecting said ejecting and injecting means for simultaneous operation by the driven one of said means, said connecting means including a yieldable driving element for permitting movement of the driven one of said means independently of the other means upon a jamming of said other means.

55. In combination, a mechanism for assembling screw and washer elements, means for feeding said elements to said mechanism for assembly thereby, means for ejecting assembled units from said assembly mechanism, and electrically operable detector means operatively controlling said ejecting means for preventing ejection of an unassembled element from said assembly mechanism.

56. In a machine for assembling screw and washer elements, a rotary member having means adapted to receive and support a screw element on said rotary member, means for feeding a washer element to a point in juxtaposition to said rotary member for reception by the screw element carried by said rotary member, a gravity chute for feeding screw elements to a point in juxtaposition to said rotary member, and shiftable injecting means for transferring a screw element from said chute into said receiving means with the shank of said screw element extending radially relative to the axis of said rotary member and projecting peripherally therebeyond.

57. In a machine for assembling screw and washer elements, a rotary member having means adapted to receive and support a screw element on said rotary member, means for feeding a washer element to a point in juxtaposition to said rotary member for reception by the screw element carried by said rotary member, and means for injecting a screw element into said receiving means with the shank of said screw element extending radially relative to the axis of said rotary member and projecting peripherally therebeyond, said means comprising a lever having a notch for receiving a screw element and being pivoted for movement in a plane including, and extending radially of, the axis of rotation of said rotary member.

58. In a machine for producing assembled screw and washer units, a mechanism for assemblink screw elements with washers, means for feeding screw elements into said assembly mechanism, means for feeding washers to a point in juxtaposition to said assembly mechanism, means included in said assembly mechanism for bodily moving each screw element along a path such that in moving the screw element telescopes with a washer at said point and extracts the washer from its feeding means and means for thereafter enlarging the screw element at a point beyond the washer so that the diameter of the screw element at said point exceeds the diameter of the hole in the washer.

59. A mechanism for assembling headed screw elements with washers, comprising a rotary member having an arcuate rim portion, said rim portion having a plurality of recesses each for receiving the head of a screw element with the shank of the screw element extending radially outwardly beyond the periphery of said rim portion, a plurality of clamps, one for each of said recesses, shiftably mounted on said rotary member and constructed to engage and releasably retain the screw elements in said recesses, a holder for washers which supports each washer in a position such that upon operation of the rotary member the shank of a screw element carried thereby is progressively projected into the washer aperture and engages the washer to extract the washer from the holder as the operation of the rotary member continues, means for operating said rotary member, and means for releasing said clamps to permit extraction of the assembled screw and washer units from said recesses of the rotary member.

60. A mechanism for assembling screw elements with washers, comprising a rotary washer having an arcuate rim portion, said rim portion having a plurality of recesses each for receiving the head of a screw element with the shank of the screw element extending radially outwardly beyond the periphery of said rim portion, means for releasably clamping the screw elements to the rotary member and holding the screw elements against movement relative to said member, a holder for washers which supports each washer in a position such that upon operation of the rotary member the shank of a screw element carried thereby is progressively projected into the washer aperture and engages the washer to extract the washer from the holder as the operation of the rotary member continues, means for operating said rotary member, and means for actuating said clamping means.

61. A mechanism for assembling screw elements with washers, comprising an assembly wheel having a rim portion, said rim portion having a plurality of recesses each for receiving the head of a screw element with the shank of the screw element extending radially outwardly beyond the periphery of said rim portion, means for releasably clamping said screw elements to the assembly wheel, means for feeding washers to a predetermined point in juxtaposition to the rim portion of said assembly wheel and in the path of movement of the screw elements carried by the assembly wheel to cause each screw element to telescope with a washer at said predetermined point as the assembly wheel is actuated, and means actuating said assembly wheel.

62. A mechanism for assembling screw elements with washers, comprising an assembly wheel having a rim portion, said rim portion having a plurality of recesses each for receiving the head of a screw element with the shank of the screw element extending radially outwardly beyond the periphery of said rim portion, means for releasably clamping said screw elements to the assembly wheel, means for feeding washers to a predetermined point in juxtaposition to the rim portion of said assembly wheel and in the path of movement of the screw elements carried by the assembly wheel to cause each screw element to telescope with a washer at said predetermined point as the assembly wheel is actuated, and means actuating said assembly wheel, said actuating means including a driving member and a yieldable connection for permitting operation of the driving member independently of the assembly wheel if the wheel becomes held against movement.

63. A method of assembling a screw element with a washer element to provide combined screw and washer units, which comprises conveying a first element of each unit to a predetermined position, conveying the second, complementary element of the unit along a predetermined path in such manner that in moving along said path the second element is brought into telescopic relation with the first element to engage and cause the first element to move from its predetermined position with the second element as a temporarily assembled unit, and while the screw element is thus temporarily assembled with a washer element, enlarging the screw element at a point beyond the washer element so that the outside diameter of the screw element at said point exceeds the diameter of the hole in the washer element, thereby permanently to maintain the washer and screw element in assembled relation.

64. A method of assembling a screw element with a washer element to provide combined screw and washer units, which comprises conveying the screw and washer elements along predetermined intersecting paths to bring the elements into telescopic relation at a predetermined point, releasing one of the elements of the thus temporarily assembled unit while continuing the conveyance of the other element of the unit to withdraw the temporarily assembled unit from said point and to feed the unit to a point of delivery, and while the screw element is thus temporarily assembled with a washer element, enlarging the screw element at a point beyond the washer element so that the outside diameter of the screw element at said point exceeds the diameter of the hole in the washer element, thereby permanently maintaining the washer and screw elements in assembled relation.

65. A method of assembling a screw element having a clamping head with a washer element to provide a combined screw and washer unit, which comprises feeding a first element of the unit to a predetermined position, feeding the second, complementary element of the unit bodily along a predetermined closed path extending transversely with respect to its axis while holding the second element against movement longitudinally of its axis, directing the second element while moving along said predetermined closed path transverse to its axis into telescoping relation to the first element and into engagement therewith to convey the first element away from said predetermined position as a unit with the second element and directing an assembled unit out of said closed path while continuing the feed of an unassembled, second element along said closed path.

66. An attachment for converting a thread forming machine into a machine for permanently assembling combined screw and washer units, said machine having means for feeding screw elements to a thread forming mechanism, said attachments comprising means for feeding washer elements, means for assembling screw elements with said washer elements, said assembling means including means receiving a first element of each unit from its feeding means and bodily moving this first element along a given path such that in moving the first element telescopes with a second complementary element of the units and extracts the complementary element from its feeding means, and means for returning the assembled units to said screw blank feeding means.

67. A machine for permanently assembling combined screw and washer units, comprising means for holding one of the elements of each unit, mechanism for bodily moving the complementary element of the unit along a given path such that in moving it engages and extracts the first-mentioned element of the unit from its holding means in telescoped relation with the complementary element, and means operatively associated with said mechanism for thereafter enlarging the screw element at a point beyond the washer element so that the outside diameter of the screw element at said point exceeds the diameter of the hole in the washer element thereby permanently to retain the elements in assembled relation.

68. A machine for permanently assembling combined screw and washer units, comprising a pair of relatively shiftable holders for the screw and washer elements of said units, means for supplying the screw elements to one of said holders and the washer elements to the other of said holders, means for shifting said holders relatively first in an approaching direction to telescope said elements and then in a recessive direction to cause one of the telescoped elements in moving with its holder to withdraw the complementary element from the other holder, and means operatively associated with said holders for enlarging the screw element at a point beyond the washer so that the outside diameter of the screw element at said point exceeds the diameter of the hole in the washer element thereby permanently to maintain the washer and the screw element in assembled relation.

69. A machine for permanently assembling combined screw and washer units, comprising a pair of relatively shiftable holders for the screw and washer elements of said units, means for supplying the screw elements to one of said holders and the washer elements to the other of said holders, means for shifting said holders relatively first in an approaching direction to telescope said elements and then in a recessive direction to cause one of the telescoped elements in moving with its holder to withdraw the complementary element from the other holder, means for enlarging the screw element at a point beyond the washer so that the outside diameter of the screw element at said point exceeds the diameter of the hole in the washer element thereby permanently to retain the washer and screw elements in assembled relation, and means including one of said holders for feeding the assembled elements to the enlarging mechanism.

70. In a screw and washer assembly mechanism, washer feed means comprising a washer hopper, a gravity feed chute for conveying washers by gravity to a desired point, and a rotary member in said hopper and constructed to feed washers in succession to said chute, spring-urged washer restraining means at the discharge end of the chute and engaging the foremost washer fed by the chute for holding the washer in position for assembly and for releasing the foremost washer upon the application of an additional force to said washer, and means for telescoping a screw element with the foremost washer held by said restraining means and for applying an additional force to said washer to withdraw the washer from said restraining means as an assembled unit with said screw.

71. In a mechanism for assemblying screw and washer elements, a mechanism for telescoping screw elements and washers, an inclined chute for feeding screw elements, means for transferring the screw elements from the guide chute to said telescoping mechanism, a gravity feed chute for conveying washers to an assembly point in juxtaposition to a screw in said telescoping mechanism, means for driving said telescoping mechanism to telescope a screw element carried thereby with the washer in juxtaposition thereto, resilient means for retaining the washers at the assembly point against the action of gravity alone and releasing the washer when telescoped with the screw element, and means for ejecting the assembled screw and washer elements from the telescoping mechanism.

72. In a screw and washer assembly machine, a washer hopper receiving a random mass of washers, means including a gravity chute for conveying washers to a desired assembly point, releasable washer restraining means adjacent the discharge end of the chute at the assembly point for preventing discharge of the washers and for releasing the washers upon the application of an additional force to the washers, means for telescoping a screw element with the washer to withdraw the washer from the assembly point as an assembled unit with the screw, washerless screw element detector means operatively associated with said telescoping means, and means controlled by said detector means for separating the units assembled by said telescoping means from such screw elements as, due to the absence of washers at the assembly point, are not assembled with washers by said telescoping means.

73. In a mechanism for assembling screws and washers, a rotary carrier adapted to receive and convey elements of one kind, a holder receiving elements of the other kind, means for causing the elements to be telescopically assembled while held in the carrier and holder respectively and the assembled elements thereafter to be conveyed by the carrier, and means disposed relative to the carrier in the path of the assembled elements in the carrier to engage and eject them from the carrier, but disposed out of the path of an unassembled element in the carrier to pass unassembled elements.

74. In a screw and washer assembly machine, washer feeding means comprising a washer receiving hopper, a member having a plane surface inclined downwardly in the hopper and lying below and receiving a collection of washers in the hopper for movement by gravity thereon, said member being peripherally recessed to receive the washers, an inclined washer feed chute receiving at its entry end washers properly positioned in the recessed periphery of said member for movement along the chute to an assembly point, a device engaging any washer not in the correct position at the entrance end of the chute for directing the washer away from the chute entrance, means at the assembly point for releasably retaining the washers, and mechanism for telescoping the screw element with a washer held in the retaining means at the assembly point and releasing the washer when telescoped from the retaining means.

75. In a screw and washer assembly machine, a mechanism for feeding washers comprising a washer hopper, a rotary disc mounted to move below a collection of washers in the hopper and arranged to carry washers out of the hopper, an inclined chute to which the washers are carried by the disc for feeding the washers to an assembly point, said rotary disc being peripherally recessed to receive washers in the plane of the disc, means juxtaposed to the surface of the disc to engage and prevent washers other than those lying in the plane of the disc from being carried out of the hopper, means at the assembly point for releasably restraining the washers, and mechanism for telescoping a screw element with the washer held in the restraining means at the assembly point and releasing the washer when telescoped from the restraining means.

76. Attachments for a thread forming machine having means for feeding screw blanks to a thread forming mechanism, said attachments comprising means for feeding washers, means for assembling screw blanks with said washers, shiftable means for injecting screw blanks into said assembling means, said assembling mean including means for receiving the screw blanks from the injecting means and then assembling the blanks with washers, and shiftable means for transferring the assembled blanks and washers from said assembling means to said screw blank feeding means in advance of said thread forming mechanism.

CARL G. OLSON.